(12) United States Patent
Hirono et al.

(10) Patent No.: US 9,051,938 B2
(45) Date of Patent: Jun. 9, 2015

(54) FAN BEARING SYSTEM HAVING A FLUID RESERVOIR

(75) Inventors: Teiichi Hirono, Kyoto (JP); Shinichiro Noda, Kyoto (JP); Yoshiharu Ikegami, Kyoto (JP); Tomohiro Hasegawa, Kyoto (JP); Tomohiro Yoneda, Kyoto (JP); Shunji Matsumoto, Kyoto (JP); Seungsin Yoo, Kyoto (JP); Kouta Kabune, Kyoto (JP); Kiyoto Ida, Kyoto (JP); Naoki Matsuba, Kyoto (JP); Tatsuya Akase, Kyoto (JP); Takehito Tamaoka, Kyoto (JP); Kazuhiko Fukushima, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 319 days.

(21) Appl. No.: 13/539,957

(22) Filed: Jul. 2, 2012

(65) Prior Publication Data

US 2013/0004350 A1    Jan. 3, 2013

(30) Foreign Application Priority Data

Jun. 30, 2011 (JP) ................................. 2011-146390
Apr. 12, 2012 (JP) ................................. 2012-091079

(51) Int. Cl.
*F04B 35/04* (2006.01)
*F04D 25/06* (2006.01)
(Continued)

(52) U.S. Cl.
CPC ............ *F04D 25/062* (2013.01); *F16C 17/102* (2013.01); *F04D 29/057* (2013.01);
(Continued)

(58) Field of Classification Search
CPC ...... F04D 29/05; F04D 29/051; F04D 29/056; F04D 29/057; F04D 29/063; F04D 29/263; F04D 29/38; F04D 29/626; F04D 25/062; F04D 25/0626; F16C 33/745
USPC .................... 417/365, 423.13, 352, 353, 354; 384/100, 107, 114, 119
See application file for complete search history.

(56) References Cited

U.S. PATENT DOCUMENTS

| 7,798,721 B2 | 9/2010 | Shibahara et al. |
| 2003/0063974 A1* | 4/2003 | Hsieh ............................ 416/182 |

(Continued)

FOREIGN PATENT DOCUMENTS

| CN | 1614249 A | 5/2005 |
| JP | 2005-155912 A | 6/2005 |

(Continued)

OTHER PUBLICATIONS

U.S. Non-Final Office Action dated Sep. 4, 2014, issued in U.S. Appl. No. 13/523,024 (19 pages).

(Continued)

*Primary Examiner* — Bryan Lettman
*Assistant Examiner* — Timothy P Solak
(74) *Attorney, Agent, or Firm* — Westerman, Hattori, Daniels & Adrian, LLP

(57) ABSTRACT

A fan includes a motor and an impeller. The motor includes a stationary portion and a rotating portion rotatably supported by the stationary portion. The stationary portion includes a stator and a bearing portion arranged inside of the stator. The rotating portion includes a rotor magnet arranged radially outside the stator; a shaft inserted in the bearing portion, and having an upper portion fixed to the impeller directly or through one or more members; and a thrust portion arranged axially opposite the bearing portion, and including an annular surface arranged around the shaft.

7 Claims, 19 Drawing Sheets

(51) Int. Cl.
  *F16C 17/10*    (2006.01)
  *F04D 29/057*   (2006.01)
  *F04D 29/38*    (2006.01)
  *F04D 29/063*   (2006.01)
  *F04D 29/08*    (2006.01)
  *F04D 29/051*   (2006.01)

(52) U.S. Cl.
  CPC ............ *F04D 29/38* (2013.01); *F04D 29/063* (2013.01); *F04D 29/083* (2013.01); *F04D 25/0626* (2013.01); *F04D 29/0513* (2013.01)

(56) References Cited

U.S. PATENT DOCUMENTS

| | | | |
|---|---|---|---|
| 2003/0202722 A1* | 10/2003 | Obara | 384/107 |
| 2005/0025405 A1 | 2/2005 | Tamaoka | |
| 2006/0097592 A1 | 5/2006 | Sumi | |
| 2007/0188034 A1* | 8/2007 | Yoshida | 310/90 |
| 2008/0218019 A1* | 9/2008 | Sumi | 310/90 |
| 2008/0278911 A1* | 11/2008 | Chen et al. | 361/695 |
| 2010/0166344 A1* | 7/2010 | Hori et al. | 384/107 |
| 2010/0232733 A1 | 9/2010 | Ito et al. | |
| 2012/0224951 A1 | 9/2012 | Degner et al. | |
| 2013/0004114 A1 | 1/2013 | Hasegawa et al. | |
| 2013/0004351 A1 | 1/2013 | Hirono et al. | |
| 2014/0049906 A1 | 2/2014 | Aiello et al. | |

FOREIGN PATENT DOCUMENTS

| | | |
|---|---|---|
| JP | 2007-205491 A | 8/2007 |
| JP | 2008-020058 A | 1/2008 |
| JP | 2009-213225 A | 9/2009 |
| JP | 2010-190426 A | 9/2010 |
| JP | 2013-063009 A | 4/2013 |

OTHER PUBLICATIONS

Hirono et al., "Fan"; U.S. Appl. No. 13/523,024, filed Jun. 14, 2012.

* cited by examiner

FAN BEARING SYSTEM HAVING A FLUID RESERVOIR

BACKGROUND OF THE INVENTION

1. Field of the Invention

The present invention relates to a fan arranged to produce air currents.

2. Description of the Related Art

Fans have often been used as cooling fans arranged to cool electronic components inside cases of a variety of electronic devices. A motor portion of a blower fan disclosed in JP-A 2009-213225 includes a base portion, an armature, a substantially cylindrical bearing support portion, two ball bearings, and a rotor portion. The bearing support portion is fixed in a center of the base portion. The two ball bearings are fixed to an inside surface of the bearing support portion, while the armature is fixed to an outside surface of the bearing support portion. A shaft is inserted in the ball bearings, so that the rotor portion is supported to be rotatable with respect to the bearing support portion. The base portion includes an annular groove defined therein which is arranged to surround a circumference of the bearing support portion. A helical coil spring is disposed in this groove. An upper end portion of the coil spring is arranged to be in axial contact with an insulator of the armature. Thus, vibrations of the armature are absorbed by the coil spring during rotation of the rotor portion, so that vibrations of the blower fan are reduced.

A bearing apparatus used in a spindle motor disclosed in JP-A 2005-155912 includes a shaft, a thrust plate, a sleeve, and a housing arranged in the shape of a cylinder with a bottom. The shaft is inserted in the sleeve. The housing is arranged to accommodate the sleeve. The thrust plate is arranged at a lower end portion of the shaft. An inner circumferential surface of the sleeve includes dynamic pressure generating grooves defined therein, and a radial dynamic pressure bearing is defined between an outer circumferential surface of the shaft and the inner circumferential surface of the sleeve. Each of a lower end surface of the sleeve and an upper surface of a bottom portion of the housing includes thrust dynamic pressure generating grooves defined therein. Thrust dynamic pressure bearings are defined between the lower end surface of the sleeve and an upper surface of the thrust plate, and between a lower surface of the thrust plate and the upper surface of the bottom portion of the housing.

A cooling fan disclosed in US 2008/0278911 includes a base portion, a bearing portion, a fluid dynamic bearing, a coil assembly, and an impeller.

SUMMARY OF THE INVENTION

In recent years, electronic devices, such as servers, have improved in performance, and the amount of heat generated from the electronic devices has increased accordingly. There is therefore a demand for fans in the electronic devices to be rotated at higher speeds in order to increase air volume. However, an increase in the rotation speed of the fans leads to greater vibrations of the fans, and this will affect other devices in the electronic devices. For example, vibrations of a fan may cause an error in reading or writing by a disk drive apparatus.

A primary advantage of the present invention is to reduce vibrations of a fan.

A fan according to a preferred embodiment of the present invention includes a motor and an impeller including a plurality of blades, and arranged to rotate about a central axis through the motor to produce air currents. The motor includes a stationary portion and a rotating portion rotatably supported by the stationary portion. The stationary portion includes a stator and a bearing portion arranged inside of the stator. The rotating portion includes a rotor magnet arranged radially outside the stator; a shaft inserted in the bearing portion, and having an upper portion fixed to the impeller directly or through one or more members; and a thrust portion arranged axially opposite the bearing portion, and including an annular surface arranged around the shaft. A radial dynamic pressure bearing portion arranged to generate a fluid dynamic pressure in a lubricating oil is defined in a radial gap defined between an inner circumferential surface of the bearing portion and an outer circumferential surface of the shaft, while a thrust dynamic pressure bearing portion arranged to generate a fluid dynamic pressure in the lubricating oil is defined in a thrust gap defined between the annular surface and a surface of the bearing portion which is axially opposed to the annular surface. A single seal gap arranged in an annular shape and centered on the central axis is defined between the stationary and rotating portions. The seal gap, the radial gap, and the thrust gap are arranged to together define a single continuous bladder structure, the lubricating oil is arranged continuously in the bladder structure, and a surface of the lubricating oil is defined only in the seal gap.

The present invention enables the fan to achieve reduced vibration.

BRIEF DESCRIPTION OF THE DRAWINGS

FIG. 10 is a graph showing a result of a simulation of vibration that occurs in the fan.

FIG. 11 is a graph showing a result of a simulation of vibration that occurs in the fan.

FIG. 21 is a cross-sectional view of a motor according to yet another modification of the second preferred embodiment.

FIG. 22 is a cross-sectional view of a motor according to yet another modification of the second preferred embodiment.

DETAILED DESCRIPTION OF THE PREFERRED EMBODIMENTS

Figure 1:
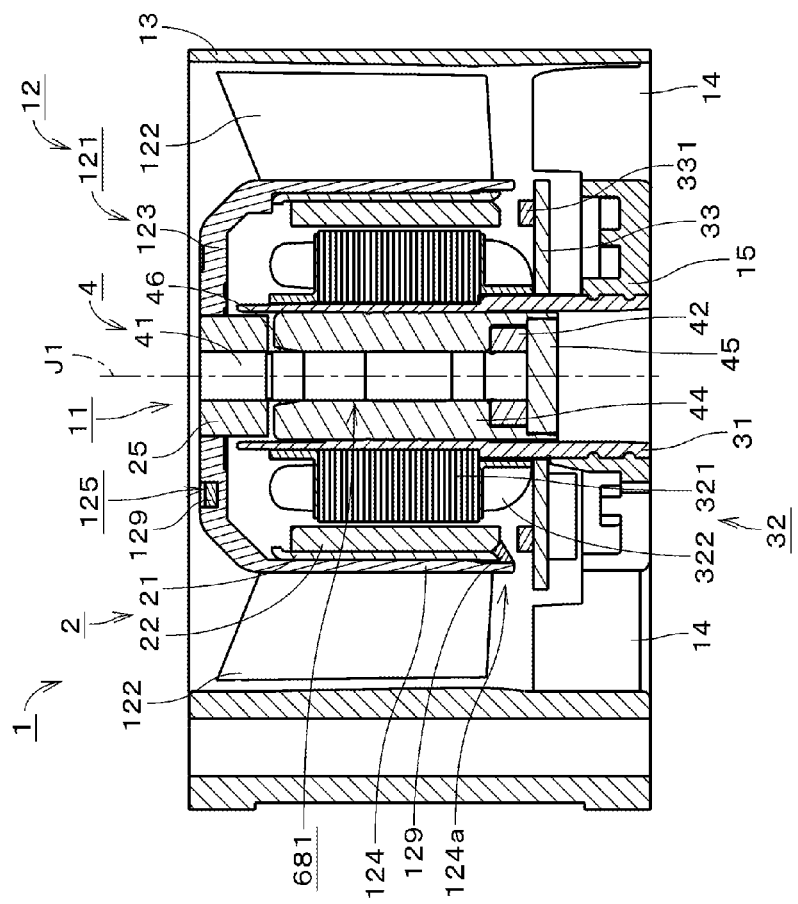
FIG. 1 is a cross-sectional view of a fan according to a first preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

First Preferred Embodiment

FIG. 1 is a cross-sectional view of an axial fan 1 according to a first preferred embodiment of the present invention. Hereinafter, the axial fan 1 will be referred to simply as the "fan 1". The fan 1 includes a motor 11, an impeller 12, a housing 13, a plurality of support ribs 14, and a base portion 15. The housing 13 is arranged to surround an outer circumference of the impeller 12. The housing 13 is joined to the base portion 15 through the support ribs 14. The support ribs 14 are arranged in a circumferential direction. The base portion 15 is defined integrally with the support ribs 14. The motor 11 is fixed on the base portion 15.

The impeller 12 is made of a resin, and includes a cup 121 and a plurality of blades 122. The cup 121 is arranged substantially in the shape of a covered cylinder. The cup 121 is arranged to cover an outside of the motor 11. The cup 121 is arranged to define a portion of a rotating portion 2 of the motor 11. The rotating portion 2 will be described below. The cup 121 includes a top face portion 123 and a side wall portion 124. The top face portion 123 is arranged to spread perpendicularly to a central axis J1. The side wall portion 124 is arranged to extend downward from an outer edge portion of the top face portion 123. The blades 122 are arranged to extend radially outward from an outer circumferential surface of the side wall portion 124 with the central axis J1 as a center. The cup 121 and the blades 122 are defined integrally with each other by a resin injection molding process.

A hole portion 125 is defined in an upper surface of the top face portion 123. A weight 129 is arranged in the hole portion 125. The weight 129 is an adhesive including a metal having a high specific gravity, such as tungsten. Another weight 129 is arranged on a lower end portion 124a of the side wall portion 124 on a radially inner side thereof. A reduction in unbalance of each of the impeller 12 and the rotating portion 2 of the motor 11 can be achieved by arranging the weight 129 on each of an upper portion and a lower portion of the impeller 12. The reduction in the unbalance leads to a reduction in vibrations of the fan 1 owing to a displacement of a center of gravity of any of the impeller 12 and the motor 11 from the central axis J1. Hereinafter, the hole portion 125 and the lower end portion 124a of the side wall portion 124, on each of which the weight 129 is arranged, will be referred to as "balance correction portions 125 and 124a", respectively.

The impeller 12 of the fan 1 is caused by the motor 11 to rotate about the central axis J1 to produce downward air currents.

The motor 11 is a three-phase outer-rotor motor. The motor 11 includes the rotating portion 2, a stationary portion 3, and a bearing mechanism 4. The rotating portion 2 includes a substantially cylindrical metallic yoke 21, a rotor magnet 22, and the cup 121. The yoke 21 is fixed to an inside of the cup 121. The rotor magnet 22 is fixed to an inner circumferential surface of the yoke 21. The rotating portion 2 is supported through the bearing mechanism 4 to be rotatable about the central axis J1 with respect to the stationary portion 3.

The stationary portion 3 includes a substantially cylindrical bearing support portion 31, a stator 32, and a circuit board 33. A lower portion of the bearing support portion 31 is fixed to an inner circumferential surface of the base portion 15 which defines a central hole portion thereof. The stator 32 is fixed to an outer circumferential surface of the bearing support portion 31 on an upper side of the base portion 15. The stator 32 is arranged radially inside the rotor magnet 22. The stator 32 includes a stator core 321 and a plurality of coils 322 arranged on the stator core 321. The stator core 321 is defined by laminated steel sheets. The circuit board 33 is fixed below the stator 32. Lead wires from the coils 322 are attached to pins (not shown) inserted in holes of the circuit board 33, whereby the stator 32 and the circuit board 33 are electrically connected with each other. Note that the lead wires from the coils 322 may be directly connected to the circuit board 33. While the motor 11 is driven, a turning force is generated between the rotor magnet 22 and the stator 32.

An annular magnetic member 331 is arranged on an upper surface of the circuit board 33. The magnetic member 331 is arranged under the rotor magnet 22. While the motor 11 is stationary, a magnetic center of the stator 32 is located at a level lower than that of a magnetic center of the rotor magnet 22. In the fan 1, magnetic attraction forces that attract the rotor magnet 22 downward are generated between the rotor magnet 22 and the stator 32, and between the rotor magnet 22 and the magnetic member 331. A force that acts to lift the impeller 12 relative to the stationary portion 3 during rotation of the fan 1 is thereby reduced.

The bearing mechanism 4 includes a shaft 41, an annular thrust plate 42, a bearing portion 44, a thrust cap 45, i.e., a cap member, and a lubricating oil 46. The top face portion 123 of the impeller 12 is indirectly fixed to an upper portion of the shaft 41 through a bushing 25 made of a metal. The thrust plate 42 is a thrust portion arranged axially opposite the bearing portion 44, and fixed to a lower portion of the shaft 41. The thrust plate 42 is arranged to extend radially outward from a lower end portion of the shaft 41. The bearing portion 44 is arranged radially inside the stator 32. Note that each of the shaft 41 and the thrust plate 42 defines a portion of the rotating portion 2, while each of the bearing portion 44 and the thrust cap 45 defines a portion of the stationary portion 3. The same is true of other preferred embodiments of the present invention described below.

Figure 2:
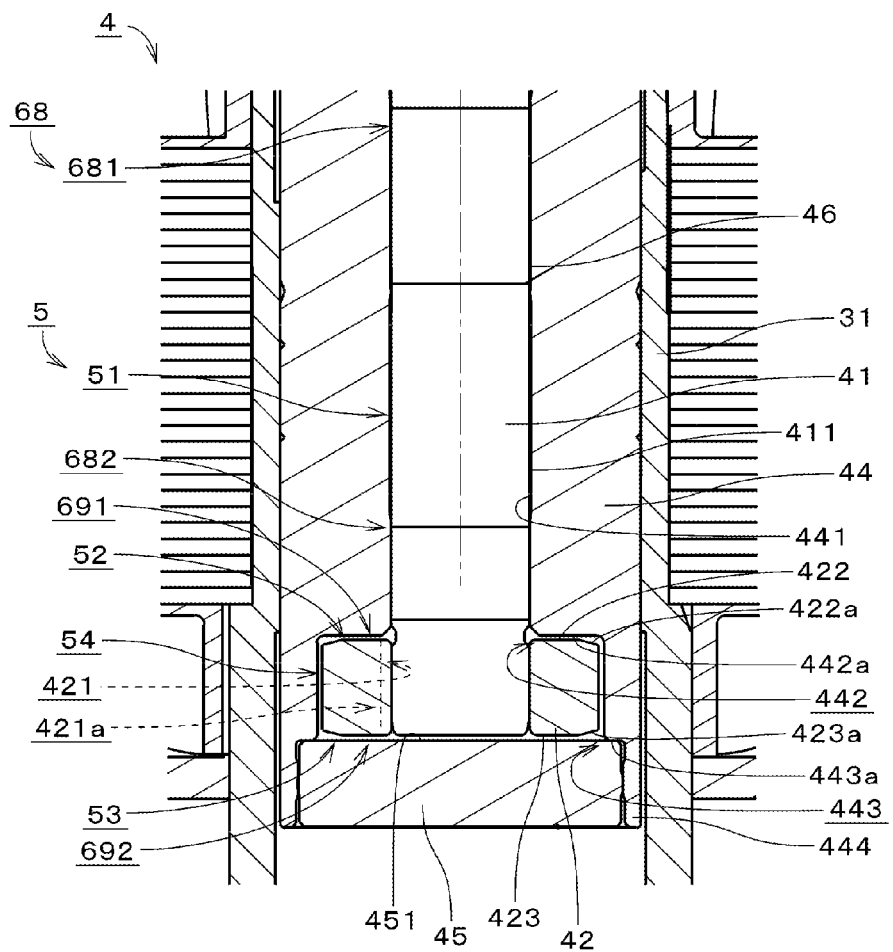
FIG. 2 is a cross-sectional view of a bearing mechanism according to the first preferred embodiment.
Figure 3:
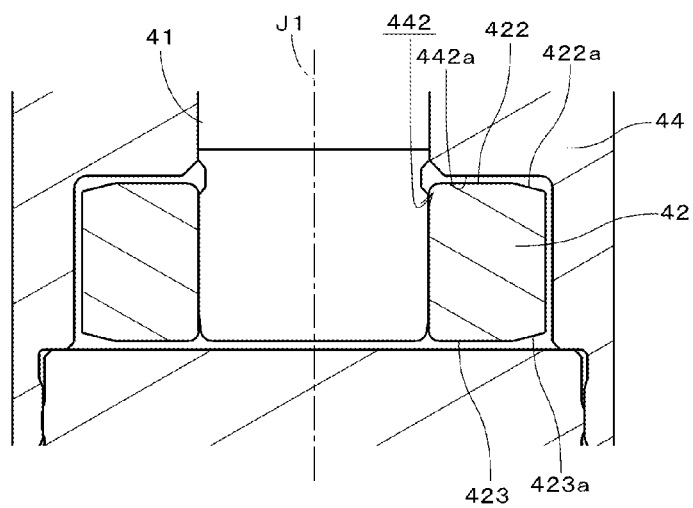
FIG. 3 is a cross-sectional view illustrating a portion of the bearing mechanism in an enlarged form.

FIG. 2 is a cross-sectional view of a lower portion of the bearing mechanism 4 and its vicinity in an enlarged form. An inner circumferential surface of the thrust plate 42 includes a groove portion 421 arranged to extend in an axial direction, and a communicating hole 421a is defined between the groove portion 421 and an outer circumferential surface 411 of the shaft 41. This contributes to reducing a difference in internal pressure of the lubricating oil 46 between an upper side and a lower side of the thrust plate 42. Referring to FIG. 3, an upper surface of the thrust plate 42 includes an inclined surface 422a defined in an outer edge portion thereof. The inclined surface 422a is arranged to be inclined downward with increasing distance from the central axis J1. A portion of the upper surface of the thrust plate 42 which is radially inward of the inclined surface 422a is an annular surface perpendicular to the central axis J1 and arranged around the shaft 41. Hereinafter, this portion of the upper surface of the thrust plate 42 will be referred to as an "upper annular surface 422". A lower surface of the thrust plate 42 includes an inclined surface 423a arranged to be inclined upward with increasing distance from the central axis J1. A portion of the lower surface of the thrust plate 42 which is radially inward of the inclined surface 423a is an annular surface perpendicular to the central axis J1. Hereinafter, this portion of the lower surface of the thrust plate 42 will be referred to as a "lower annular surface 423".

The bearing portion 44 illustrated in FIG. 2 is a single sleeve made of a metal, such as stainless steel or phosphor bronze. The bearing portion 44 is fixed to an inner circumferential surface of the bearing support portion 31. The shaft 41 is inserted in the bearing portion 44. The bearing portion 44 includes a first shoulder portion 442 defined by an increase in the diameter of an inner circumferential surface 441 of the bearing portion 44 in a lower portion of the inner circumferential surface 441, and a second shoulder portion 443 defined by an increase in the diameter of the inner circumferential surface 441 between the first shoulder portion 442 and a lower end portion 444 of the bearing portion 44. The thrust cap 45 is arranged inside of the lower end portion 444, and an outer circumferential surface of the thrust cap 45 is fixed to an inner circumferential surface of the lower end portion 444. The thrust cap 45 is arranged to close a bottom portion of the bearing portion 44. An outer edge portion of an upper surface 451 of the thrust cap 45 is arranged to be in axial contact with a lower surface 443a of the second shoulder portion 443, that is, a surface having a normal oriented downward. The thrust plate 42 is arranged between the first shoulder portion 442 and the second shoulder portion 443.

In the bearing mechanism 4, a radial gap 51 is defined between the inner circumferential surface 441 of the bearing portion 44 and the outer circumferential surface 411 of the shaft 41. A gap 52 is defined between the upper annular surface 422 of the thrust plate 42 and a lower surface 442a of the first shoulder portion 442, which is arranged axially opposite the upper annular surface 422, that is, a surface having a normal oriented downward in the axial direction. Hereinafter, the gap 52 will be referred to as a "first lower thrust gap 52". The lower annular surface 423 of the thrust plate 42 and the upper surface 451 of the thrust cap 45 are arranged axially opposite each other, and a gap 53 is defined between the lower annular surface 423 and the upper surface 451. Hereinafter, the gap 53 will be referred to as a "second lower thrust gap 53". The sum of the axial width of the first lower thrust gap 52 and the axial width of the second lower thrust gap 53 is arranged in the range of about 10 μm to about 40 μm. A gap 54 is defined between an outer circumferential surface of the thrust plate 42 and a portion of the inner circumferential surface 441 of the bearing portion 44 which is radially opposed to the outer circumferential surface of the thrust plate 42. Hereinafter, the gap 54 will be referred to as a "side gap 54".

Figure 4:
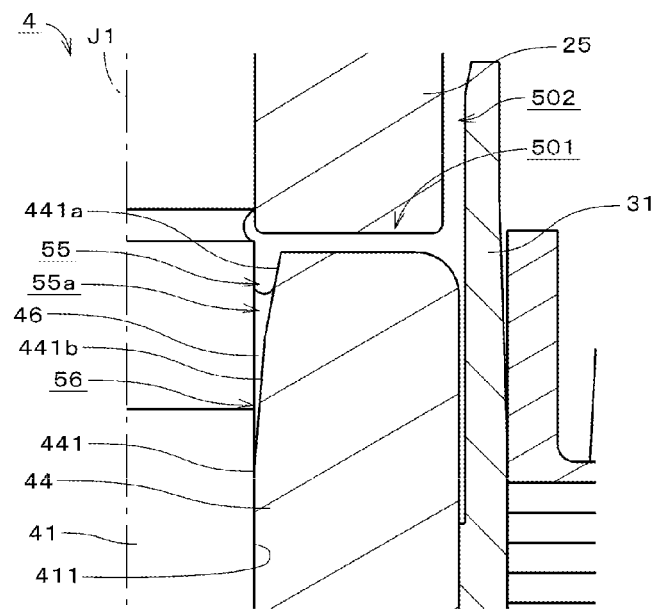
FIG. 4 is a cross-sectional view illustrating a portion of the bearing mechanism in an enlarged form.

FIG. 4 is a diagram illustrating an upper portion of the bearing portion 44 and its vicinity in an enlarged form. An upper portion of the inner circumferential surface 441 of the bearing portion 44 includes a first inclined surface 441a and a second inclined surface 441b. The first inclined surface 441a is arranged to extend radially inward and obliquely downward from an upper surface of the bearing portion 44. In other words, the diameter of the first inclined surface 441a is arranged to gradually increase with increasing height. The second inclined surface 441b is arranged to extend radially inward and obliquely downward from a lower end of the first inclined surface 441a. In other words, the diameter of the second inclined surface 441b is arranged to gradually increase with increasing height. An angle defined by the first inclined surface 441a with the central axis J1 is arranged to be greater than an angle defined by the second inclined surface 441b with the central axis J1. A boundary between the first and second inclined surfaces 441a and 441b is arranged radially inward of a radial middle point between an upper end of the first inclined surface 441a and the outer circumferential surface 411 of the shaft 41.

The first inclined surface 441a and the outer circumferential surface 411 of the shaft 41 are arranged to together define a single seal gap 55 arranged to gradually increase in radial width with increasing height. The seal gap 55 is arranged in an annular shape and centered on the central axis J1. A seal portion 55a arranged to retain the lubricating oil 46 through capillary action is defined in the seal gap 55. The seal gap 55 serves also as an oil buffer arranged to hold the lubricating oil 46. In the motor 11, the seal gap 55, the radial gap 51 illustrated in FIG. 2, the first lower thrust gap 52, the side gap 54, and the second lower thrust gap 53 are arranged to together define a single continuous bladder structure 5. The lubricating oil 46 is arranged continuously in the bladder structure 5. Within the bladder structure 5, a surface of the lubricating oil 46 is defined only in the seal gap 55 illustrated in FIG. 2.

The upper surface of the bearing portion 44 and a lower surface of the bushing 25, which is fixed to the upper portion of the shaft 41, are arranged to together define a gap 501 extending radially therebetween. An outer circumferential surface of the bushing 25 and the inner circumferential surface of the bearing support portion 31 are arranged to together define a gap 502 extending in the axial direction therebetween. The seal portion 55a is arranged to be in communication with an exterior space through the gaps 501 and 502. Here, the exterior space refers to a space above the stator 32 as illustrated in FIG. 1. Provision of the gaps 501 and 502 contributes to preventing an air including a lubricating oil evaporated from the seal portion 55a from traveling out of the bearing mechanism 4. This contributes to reducing evaporation of the lubricating oil 46 out of the bearing mechanism 4.

Figure 5:
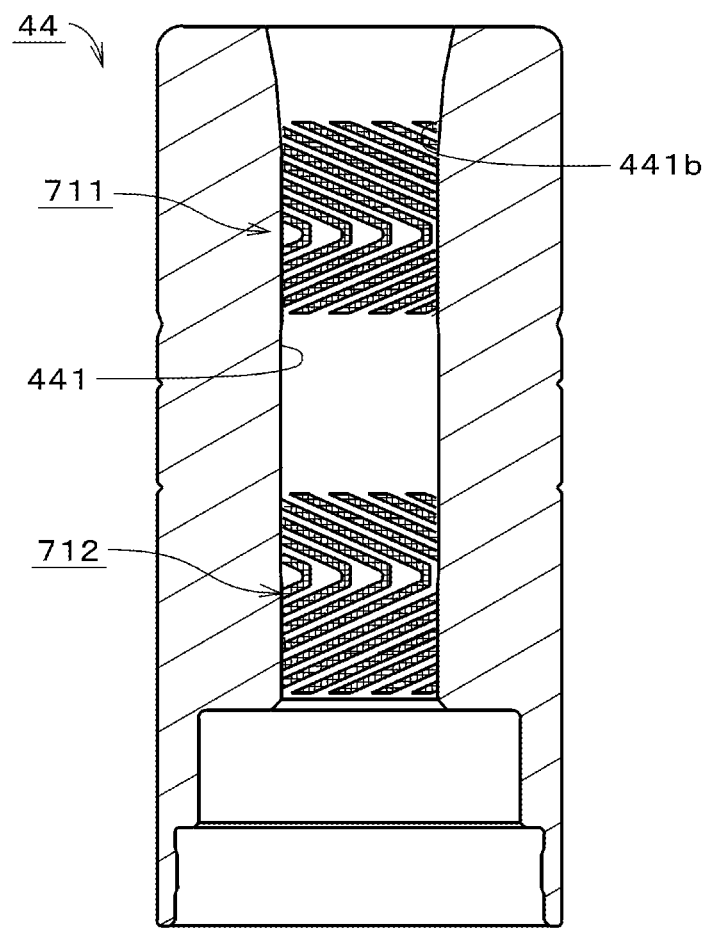
FIG. 5 is a cross-sectional view of a bearing portion according to the first preferred embodiment.

FIG. 5 is a vertical cross-sectional view of the bearing portion 44. The upper portion and the lower portion of the inner circumferential surface 441 of the bearing portion 44 include a first radial dynamic pressure groove array 711 and a second radial dynamic pressure groove array 712, respectively, defined therein. Each of the first and second radial dynamic pressure groove arrays 711 and 712 is arranged in a herringbone pattern. An outer circumferential surface of the bearing portion 44 includes minute recessed portions defined therein. The minute recessed portions are arranged axially between the first and second radial dynamic pressure groove arrays 711 and 712. Referring to FIG. 2, in an upper portion of the radial gap 51, an upper radial dynamic pressure bearing portion 681 arranged to generate a radial fluid dynamic pressure acting on the lubricating oil 46 is defined through the first radial dynamic pressure groove array 711. In a lower portion of the radial gap 51, a lower radial dynamic pressure bearing portion 682 arranged to generate a radial fluid dynamic pressure acting on the lubricating oil 46 is defined through the second radial dynamic pressure groove array 712. Hereinafter, the upper and lower radial dynamic pressure bearing portions 681 and 682 will be referred to collectively as a "radial dynamic pressure bearing portion 68". The radial dynamic pressure bearing portion 68 is arranged axially between the two balance correction portions 124a and 125 illustrated in FIG. 1. In addition, the upper radial dynamic pressure bearing portion 681 is arranged to overlap with the center of gravity of each of the motor 11 and the impeller 12 in a radial direction.

Figure 6:
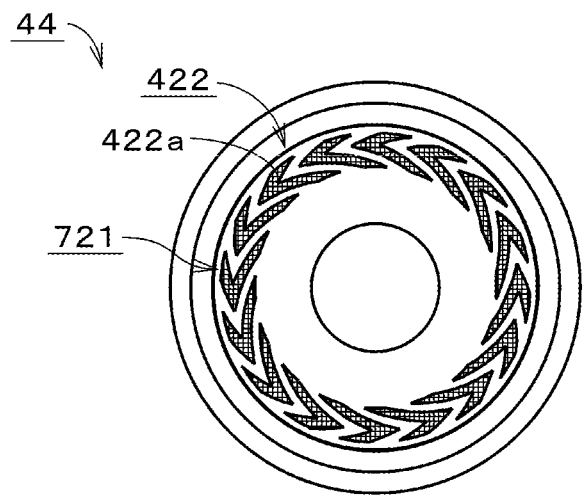
FIG. 6 is a bottom view of the bearing portion.
Figure 7:
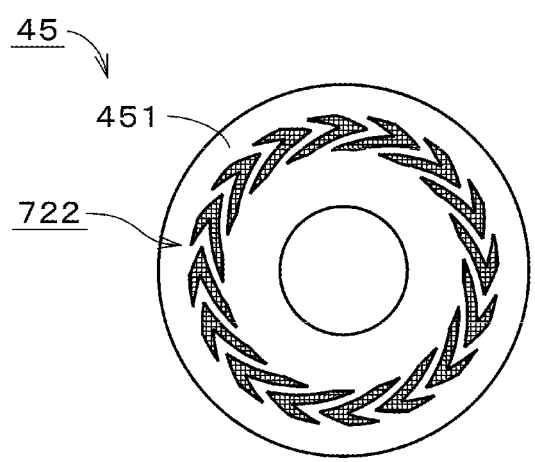
FIG. 7 is a plan view of a thrust cap according to the first preferred embodiment.

FIG. 6 is a bottom view of the bearing portion 44. The lower surface 442a of the first shoulder portion 442 includes a first thrust dynamic pressure groove array 721 arranged in the herringbone pattern. FIG. 7 is a plan view of the thrust cap 45. The upper surface 451 of the thrust cap 45, that is, a bottom surface of the bladder structure 5 illustrated in FIG. 2, includes a second thrust dynamic pressure groove array 722 arranged in the herringbone pattern. Referring to FIG. 2, in the first lower thrust gap 52, a first lower thrust dynamic pressure bearing portion 691 arranged to generate an axial fluid dynamic pressure acting on the lubricating oil 46 is defined through the first thrust dynamic pressure groove array 721. In other words, the first lower thrust dynamic pressure bearing portion 691 is defined by the upper annular surface 422 of the thrust plate 42, which corresponds to an upward-facing thrust dynamic pressure bearing surface, and the lower surface 442a of the first shoulder portion 442, which corresponds to a downward-facing thrust dynamic pressure bearing surface. In addition, in the second lower thrust gap 53, a second lower thrust dynamic pressure bearing portion 692 arranged to generate an axial fluid dynamic pressure acting on the lubricating oil 46 is defined through the second thrust dynamic pressure groove array 722.

While the motor 11 is driven, the shaft 41 is supported in the radial direction by the radial dynamic pressure bearing portion 68, and the thrust plate 42 is supported in the axial direction by the first and second lower thrust dynamic pressure bearing portions 691 and 692. As a result, the rotating portion 2 and the impeller 12 illustrated in FIG. 1 are supported to be rotatable with respect to the stationary portion 3. While the motor 11 is driven, the lubricating oil 46 circulates through the first lower thrust gap 52, the side gap 54, the second lower thrust gap 53, and the communicating hole 421a illustrated in FIG. 2. In addition, the inclined surface 422a is defined in the outer edge portion of the upper surface of the thrust plate 42 as illustrated in FIG. 3, and this contributes to preventing the thrust plate 42 from coming into hard contact with the lower surface 442a of the first shoulder portion 442 of the bearing portion 44 even when the shaft 41 is tilted.

Referring to FIG. 5, a portion of the first radial dynamic pressure groove array 711 is defined in a lower portion of the second inclined surface 441b. Referring to FIG. 4, when the shaft 41 is slightly tilted while the fan 1 is driven, a fluid dynamic pressure is generated by the first radial dynamic pressure groove array 711 in a gap 56 defined between a portion of the outer circumferential surface 411 of the shaft 41 which approaches the second inclined surface 441b and a portion of the second inclined surface 441b which is opposed to this portion of the outer circumferential surface 411. As a result, the shaft 41 is supported by the second inclined surface 441b. Thus, when the shaft 41 is tilted during rotation of the rotating portion 2, the second inclined surface 441b extends along the outer circumferential surface 411 of the shaft 41 in the gap 56, which is located below and adjacent to the seal gap 55. The shaft 41 is thus prevented from coming into hard contact with the upper portion of the bearing portion 44.

Figure 8:
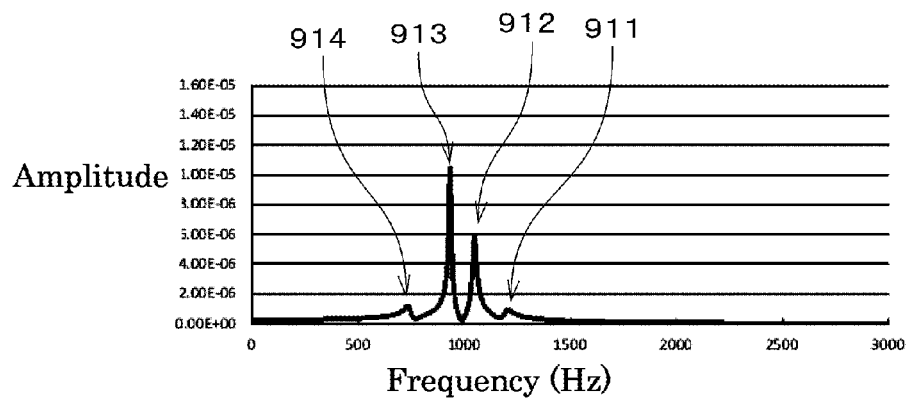
FIG. 8 is a graph showing a result of a simulation of vibration that occurs in the fan.
Figure 9:
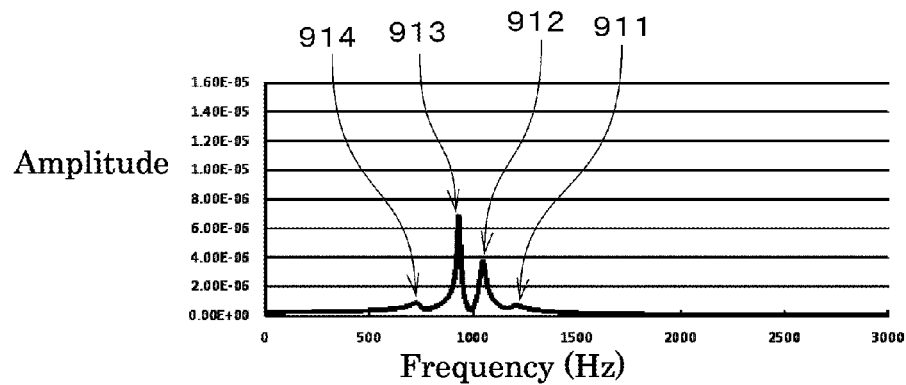
FIG. 9 is a graph showing a result of a simulation of vibration that occurs in the fan.
Figure 1:
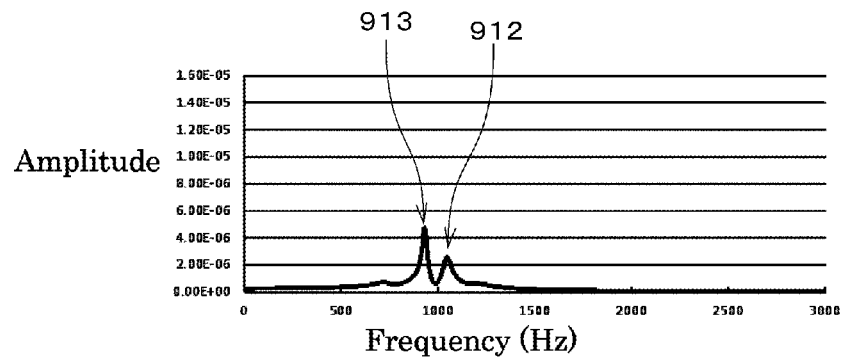
Figure 1:
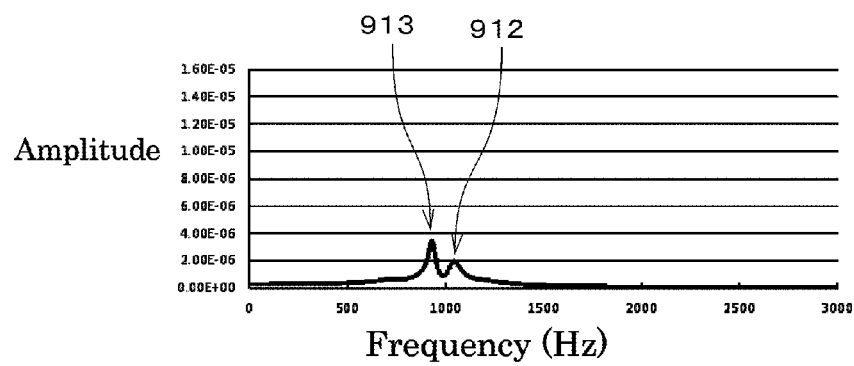
Figure 12:
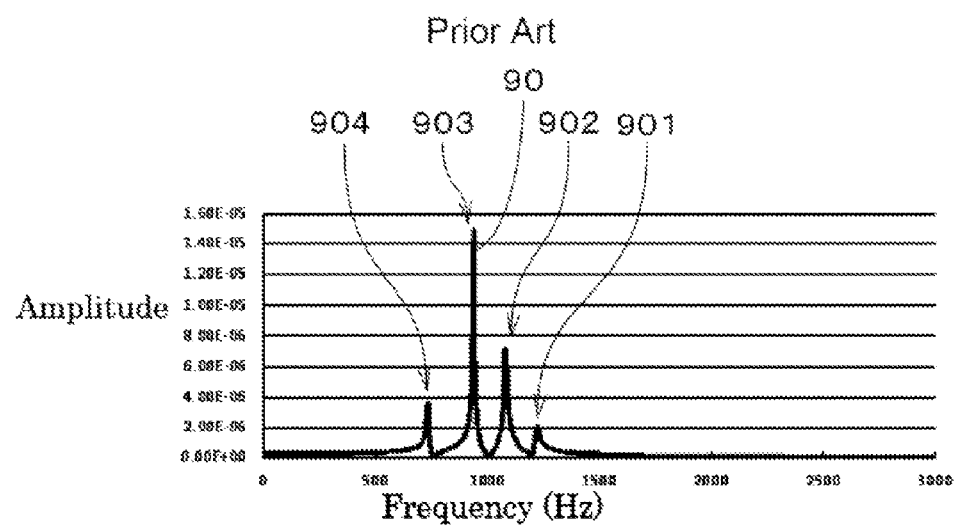
FIG. 12 is a graph showing a result of a simulation of vibration that occurs in a fan as a comparative example.

FIG. 8 is a graph showing a result of a simulation of vibration that occurs in the fan 1 in the case where the radial width of the radial gap 51 is 3 μm. A horizontal axis represents frequencies of the vibration, while a vertical axis represents the amplitude of each frequency component of the vibration. FIGS. 9, 10, and 11 are graphs showing results of simulations of vibration that occurs in the fan 1 in the case where the radial width of the radial gap 51 is 4 μm, 5 μm, and 6 μm, respectively. FIG. 12 is a graph showing a result of a simulation of vibration that occurs in a fan as a comparative example in which a motor including a ball bearing is installed.

As indicated by a curve 90 in FIG. 12, in the case of the vibration that occurs in the fan including the ball bearing, a plurality of peaks occur in the range of 750 Hz to 1250 Hz. In FIG. 12, the peaks are denoted, from right to left, by reference numerals 901, 902, 903, and 904, respectively. In contrast, referring to FIGS. 8 and 9, in the case of the bearing mechanisms 4 in which the width of the radial gap is 3 μm and 4 μm, respectively, corresponding peaks 911, 912, 913, and 914 are lower than the peaks 901, 902, 903, and 904, respectively, in FIG. 12. Further, referring to FIGS. 10 and 11, in the case of the bearing mechanisms 4 in which the width of the radial gap 51 is 5 μm and 6 μm, respectively, peaks do not occur at positions corresponding to those of the peaks 901 and 904 on the far right and on the far left, respectively, in FIG. 12. Moreover, peaks 912 and 913 corresponding to the remaining peaks 902 and 903, respectively, are less than half as high as the peaks 902 and 903, respectively.

As described above, the fan 1 is able to achieve reduced vibration as compared to known fans in which ball bearings are used. This is due to a so-called damper effect produced by the lubricating oil 46 between the shaft 41 and the bearing portion 44. In particular, a satisfying reduction in the vibration can be achieved when the radial width of the radial gap 51 is 5 m or greater. The radial width of the radial gap 51 is arranged to be 20 μm or less in order to generate a sufficient fluid dynamic pressure in the radial gap 51. More preferably, the width of the radial gap 51 is arranged in the range of about 5 μm to about 10 μm.

The fan 1 according to the first preferred embodiment has been described above. Use of the bearing mechanism 4, which is a fluid dynamic bearing mechanism, in the fan 1 contributes to reducing the vibrations of the fan 1. The reduction in the vibrations of the fan 1 leads to a reduction in power consumption of the fan 1. In addition, the motor 11 can be manufactured at a lower cost than a comparable motor in which a ball bearing is used.

In the case of a fluid dynamic bearing mechanism in which seal portions are defined in an upper portion and a lower portion of a bearing portion thereof, a sophisticated design is required to prevent a difference in pressure between the seal portions from causing a leakage of the lubricating oil 46. In contrast, the bearing mechanism 4 of the motor 11 has a so-called full-fill structure, including only one seal portion 55a, and it is therefore easy to prevent a leakage of the lubricating oil 46 in the case of the bearing mechanism 4. In addition, the surface of the lubricating oil 46 in the seal portion 55a can be maintained at a substantially fixed position. Moreover, a reduction in evaporation of the lubricating oil 46 is achieved compared to the case where a plurality of seal portions are provided. In particular, because the seal portion 55a is arranged in an inner portion of the motor 11, the seal portion 55a is not exposed to air currents while the fan 1 is driven. A further reduction in the evaporation of the lubricating oil 46 is thereby achieved. Furthermore, entry of an extraneous material into the seal portion 55a can be prevented. In the bearing mechanism 4, because the seal portion 55a is defined around the shaft 41, a leakage of the lubricating oil 46 out of the seal portion 55a owing to a centrifugal force can be prevented more effectively than in the case where the seal portion is arranged away from and radially outward of the shaft 41.

Because the sum of the axial width of the first lower thrust gap 52 and the axial width of the second lower thrust gap 53 is arranged in the range of about 10 m to about 40 µm, the fluid dynamic pressures can be generated while ensuring the damper effect owing to the lubricating oil 46.

Because the second inclined surface 441b in which a portion of the first radial dynamic pressure groove array 711 is defined is arranged in the inner circumferential surface 441 of the bearing portion 44, it is possible to support the shaft 41 sufficiently even if the radial gap 51 is widened. Consequently, it is possible to prevent a reduction in bearing rigidity even when the fan 1 is caused to rotate at a high speed or in a high-temperature condition.

Because the motor 11 is a three-phase motor, the motor 11 is capable of being rotated at a high speed. It is therefore easy to cause the frequencies of the vibration that can occur in the motor 11 to deviate from a frequency band that may affect another device in an electronic device in which the fan 1 is installed.

The magnetic member 331 provided in the motor 11 generates the magnetic attraction force that attracts the rotor magnet 22 downward. This contributes to reducing an increase in a bearing loss that occurs in the first lower thrust dynamic pressure bearing portion 691, while the fan 1 is driven, owing to the force that acts to lift the impeller 12 relative to the stationary portion 3. Moreover, the additional magnetic attraction force that attracts the rotor magnet 22 downward is generated because the magnetic center of the stator 32 is arranged at a level lower than that of the magnetic center of the rotor magnet 22. This contributes to further reducing the increase in the bearing loss that occurs in the first lower thrust dynamic pressure bearing portion 691.

Because the radial dynamic pressure bearing portion 68 is arranged axially between the two balance correction portions 124a and 125, each of the rotating portion 2 and the impeller 12 is capable of stable rotation, and a further reduction in the vibrations is thereby achieved. In addition, it is possible to reduce the axial length of the radial dynamic pressure bearing portion 68, and to shorten the bearing portion 44. This makes it possible to manufacture the bearing portion 44 with high precision. The axial length of the bearing portion 44 is preferably arranged to be less than about four times the diameter of the bearing portion 44. Because the upper radial dynamic pressure bearing portion 681 is arranged to overlap with the center of gravity of each of the motor 11 and the impeller 12 in the radial direction, stability of the rotation of each of the rotating portion 2 and the impeller 12 is increased, and a further reduction in the vibrations is thereby achieved. The same is true of other preferred embodiments of the present invention described below.

Figure 13:
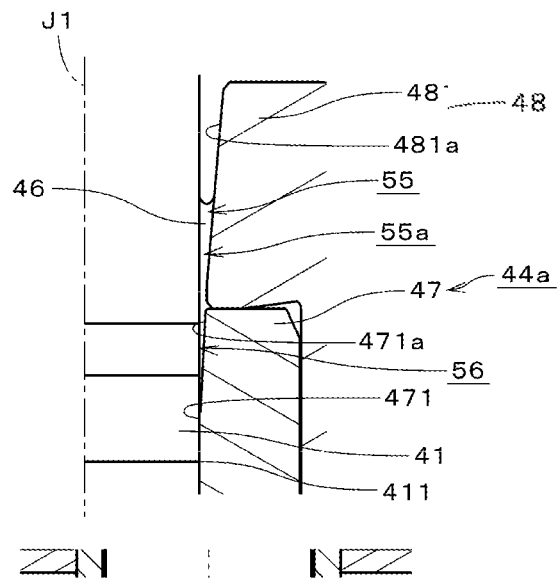
FIG. 13 is a cross-sectional view of a bearing mechanism according to a modification of the first preferred embodiment.

FIG. 13 is a cross-sectional view of a bearing mechanism 4 according to a modification of the first preferred embodiment. A bearing portion 44a of the bearing mechanism 4 includes a tubular sleeve 47 and a bearing housing 48. The sleeve 47 is defined by a metallic sintered body. The sleeve 47 is impregnated with a lubricating oil 46. The bearing housing 48 is arranged to cover an outer circumferential surface of the sleeve 47. The bearing housing 48 includes an annular upper portion 481 arranged to extend radially inward on an upper side of the sleeve 47. A circulation hole arranged to extend in the axial direction is defined between the sleeve 47 and the bearing housing 48. The lubricating oil 46 is arranged to circulate through the circulation hole, a gap defined between a lower surface of the annular upper portion 481 and an upper surface of the sleeve 47, a radial gap 51, and a first lower thrust gap 52.

Figure 14:
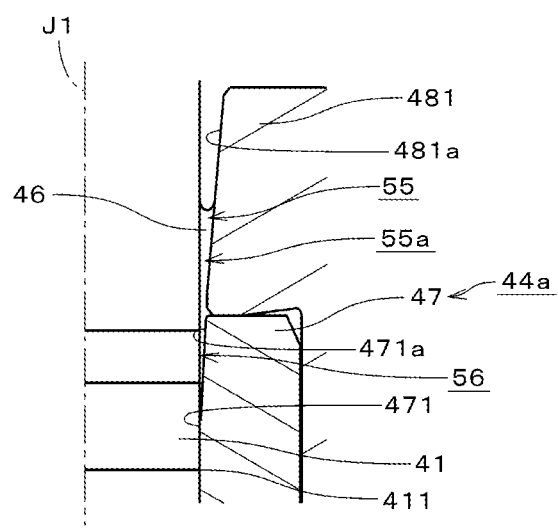
FIG. 14 is a cross-sectional view illustrating a portion of the bearing mechanism in an enlarged form.

Referring to FIG. 14, an inner circumferential surface 481a of the annular upper portion 481 is an inclined surface whose diameter gradually increases with increasing height. In other words, the inner circumferential surface 481a is arranged to be inclined radially inward with decreasing height. Hereinafter, the inner circumferential surface 481a will be referred to as a "first inclined surface 481a". An upper portion of an inner circumferential surface 471 of the sleeve 47 includes an inclined surface 471a whose diameter gradually increases with increasing height. In other words, the inclined surface 471a is arranged to be inclined radially inward with decreasing height. Hereinafter, the inclined surface 471a will be referred to as a "second inclined surface 471a". An angle defined by the first inclined surface 481a with a central axis J1 is arranged to be greater than an angle defined by the second inclined surface 471a with the central axis J1. The bearing mechanism 4 according to the present modification of the first preferred embodiment is otherwise similar in structure to the bearing mechanism 4 illustrated in FIG. 2.

A seal gap 55 arranged to gradually increase in radial width with increasing height is defined between the first inclined surface 481a and an outer circumferential surface 411 of a shaft 41. Adjacent to and below the seal gap 55, a gap 56 is defined between the outer circumferential surface 411 of the shaft 41 and the second inclined surface 471a. A seal portion 55a arranged to retain the lubricating oil 46 through capillary action is defined in the seal gap 55. Because the seal portion 55a is defined around the shaft 41, a leakage of the lubricating oil 46 out of the seal portion 55a due to a centrifugal force is prevented.

A portion of a first radial dynamic pressure groove array 711 similar to the first radial dynamic pressure groove array 711 illustrated in FIG. 5 is defined in a lower portion of the second inclined surface 471a. When the shaft 41 is slightly tilted while a fan 1 is driven, the second inclined surface 471a extends along the outer circumferential surface 411 of the shaft 41, so that a fluid dynamic pressure is generated in the gap 56. The shaft 41 is thereby supported by the second inclined surface 471a so that the shaft 41 can be prevented from coming into hard contact with an upper portion of the bearing portion 44a.

Second Preferred Embodiment

Figure 15:
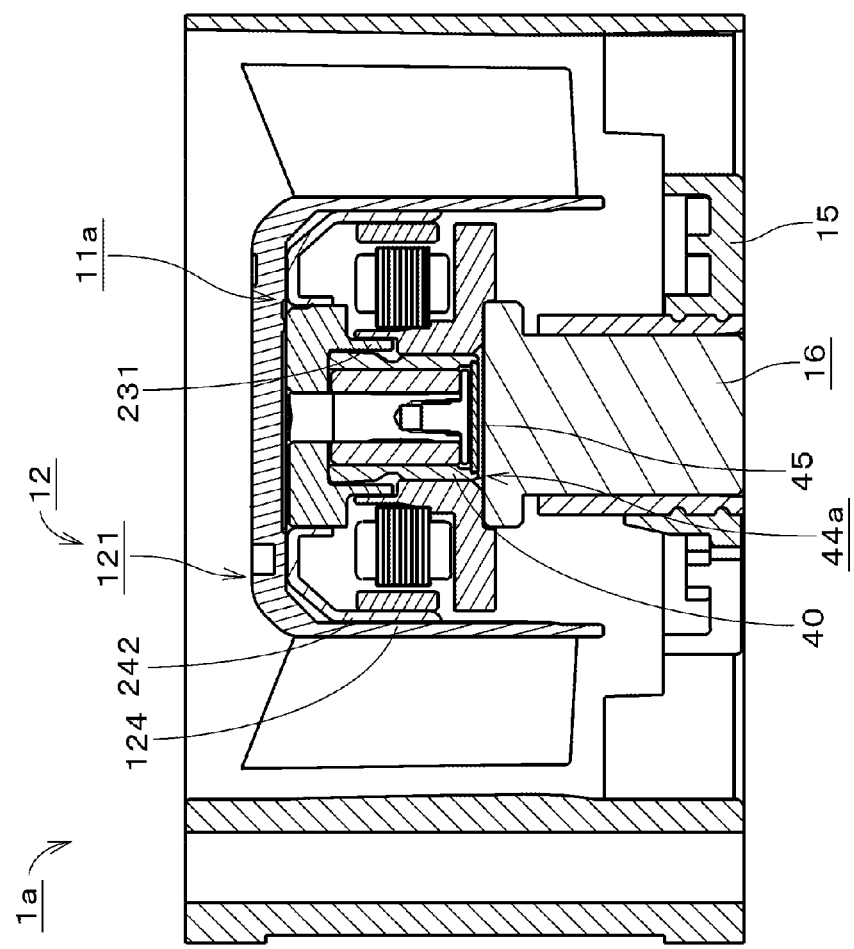
FIG. 15 is a cross-sectional view of a fan according to a second preferred embodiment of the present invention.

FIG. 15 is a cross-sectional view of a fan 1a according to a second preferred embodiment of the present invention. The fan 1a includes a motor 11a and a support portion 16. The motor 11a has a structure different from that of the motor 11 illustrated in FIG. 1. The fan 1a is otherwise similar in structure to the fan 1 according to the first preferred embodiment. Accordingly, like members or portions are designated by like reference numerals, and redundant description is omitted. The support portion 16 is substantially columnar in shape, and is arranged to support the motor 11a from below. A lower portion of the support portion 16 is fixed to a hole portion of a base portion 15.

Figure 16:
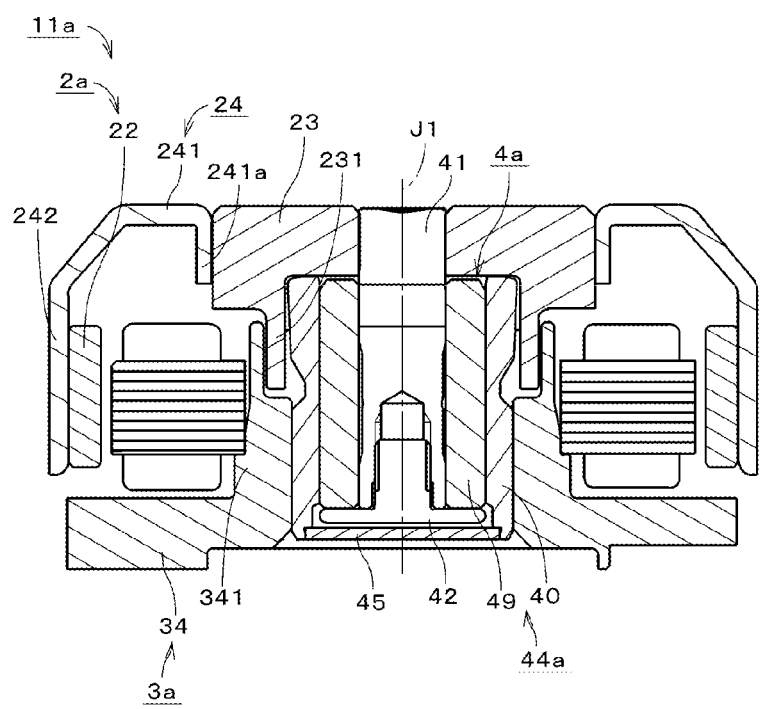
FIG. 16 is a cross-sectional view of a motor according to the second preferred embodiment.

FIG. 16 is a diagram illustrating the motor 11a. The motor 11a is a three-phase motor. The motor 11a includes a rotating portion 2a, a stationary portion 3a, and a bearing mechanism 4a. The rotating portion 2a includes a rotor magnet 22, a rotor holder 23, and a metallic yoke portion 24.

The rotor holder 23 includes a tubular portion 231 arranged substantially in the shape of a cylinder and centered on a central axis J1. The tubular portion 231 is arranged to extend downward from a lower surface of the rotor holder 23. The yoke portion 24 includes a top plate portion 241 and a cylindrical portion 242. The top plate portion 241 includes a cylindrical burring portion 241a arranged to extend downward. The rotor holder 23 is press fitted to the burring portion 241a, so that the yoke portion 24 and the rotor holder 23 are fixed to each other. The rotor magnet 22 is fixed to an inner circumferential surface of the cylindrical portion 242. Referring to FIG. 15, the cylindrical portion 242 is fixed to an inner circumferential surface of a side wall portion 124 of a cup 121.

Referring to FIG. 16, the stationary portion 3a includes a motor base portion 34 and a stator 32. The motor base portion 34 is arranged on an upper surface of the support portion 16 as illustrated in FIG. 15. The stator 32 is fixed to an outer circumferential surface of a cylindrical holder 341 arranged in a center of the motor base portion 34.

The bearing mechanism 4a includes a shaft 41, a thrust plate 42, a bearing portion 44a, and a thrust cap 45. An upper portion of the shaft 41 is fixed to a central hole portion of the rotor holder 23. The thrust plate 42 is fixed to a lower portion of the shaft 41.

The bearing portion 44a includes a tubular sleeve 49 and a bearing housing 40. The sleeve 49 is defined by a metallic sintered body. A lower portion of the bearing housing 40 is fixed inside the holder 341 of the motor base portion 34. The tubular portion 231 is arranged radially outward of the bearing housing 40. The bearing housing 40 is arranged to cover an outer circumferential surface of the sleeve 49. The sleeve 49 is arranged to cover an outer circumference of the shaft 41. The thrust cap 45 is arranged to close a bottom portion of the bearing housing 40. In a lower portion of the bearing mechanism 4a, the sleeve 49 is axially opposed to the thrust plate 42. In an upper portion of the bearing mechanism 4a, each of the sleeve 49 and the bearing housing 40 is axially opposed to the rotor holder 23.

Referring to FIG. 15, a lower end portion of the bearing portion 44a, that is, a lower end portion of the bearing housing 40, is arranged at a level higher than that of a lower end of an impeller 12, that is, a lower end of the side wall portion 124 of the cup 121.

Figure 17:
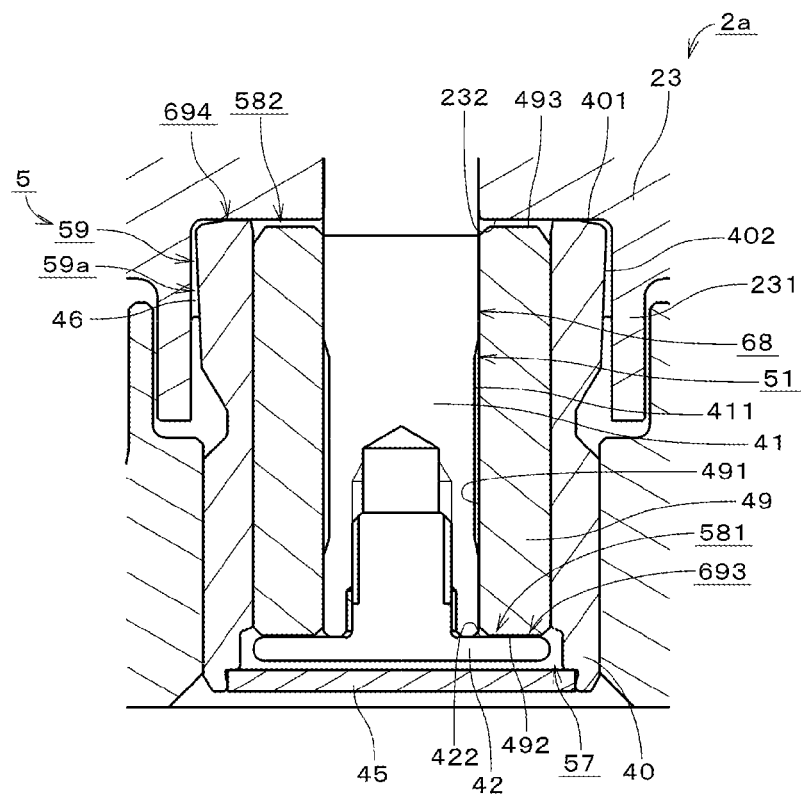
FIG. 17 is a cross-sectional view of a bearing mechanism according to the second preferred embodiment.

Referring to FIG. 17, a gap 57 is defined between an outer edge portion of the thrust plate 42 and a lower portion of an inner circumferential surface of the bearing housing 40, and between a lower surface of the thrust plate 42 and an upper surface of the thrust cap 45. Hereinafter, the gap 57 will be referred to as a "lower gap 57". A lower surface 492 of the sleeve 49, which faces downward in the axial direction, is arranged axially opposite an upper annular surface 422 of the thrust plate 42, and a gap 581 is defined between the lower surface 492 and the upper annular surface 422. Hereinafter, the gap 581 will be referred to as a "lower thrust gap 581". A radial gap 51 is defined between an inner circumferential surface 491 of the sleeve 49 and an outer circumferential surface 411 of the shaft 41. A lower surface of the rotor holder 23 includes an annular surface 232 facing downward in the axial direction and arranged around the shaft 41 and inside of the tubular portion 231. The surface 232 is arranged axially opposite each of an upper surface 493 of the sleeve 49 and an upper surface 401 of the bearing housing 40, each of which faces upward in the axial direction. Hereinafter, the surface 232 will be referred to as a "rotor annular surface 232". A gap 582 is defined between the rotor annular surface 232 and each of the upper surface 493 of the sleeve 49 and the upper surface 401 of the bearing housing 40. Hereinafter, the gap 582 will be referred to as an "upper thrust gap 582". A gap 59 is defined between an upper portion of an outer circumferential surface 402 of the bearing housing 40 and an inner circumferential surface of the tubular portion 231 of the rotor holder 23. The gap 59 is arranged to gradually increase in width with decreasing height. Hereinafter, the gap 59 will be referred to as a "seal gap 59".

In the motor 11a, the seal gap 59, the upper thrust gap 582, the radial gap 51, the lower thrust gap 581, and the lower gap 57 are arranged to together define a single continuous bladder structure 5. A lubricating oil 46 is arranged continuously in the bladder structure 5. A seal portion 59a arranged to retain the lubricating oil 46 through capillary action is defined in the seal gap 59. A surface of the lubricating oil 46 is defined only in the seal gap 59. In the following description, the thrust plate 42, which is arranged to extend radially outward from the shaft 41 at a bottom portion of the bladder structure 5, will be referred to as a "first thrust portion 42". The rotor holder 23, which is arranged to extend radially outward from the upper portion of the shaft 41, will be referred to as a "second thrust portion 23".

The lower surface 492 of the sleeve 49 includes a thrust dynamic pressure groove array similar to the thrust dynamic pressure groove array 721 illustrated in FIG. 6 defined therein, and a lower thrust dynamic pressure bearing portion 693 arranged to generate a fluid dynamic pressure acting in a thrust direction is defined in the lower thrust gap 581. The upper surface 401 of the bearing housing 40 includes a thrust dynamic pressure groove array similar to the thrust dynamic pressure groove array 722 illustrated in FIG. 7 defined therein, and an upper thrust dynamic pressure bearing portion 694 arranged to generate a fluid dynamic pressure in the lubricating oil 46 is defined in the upper thrust gap 582. In other words, the upper surface 401 of the bearing housing 40, which corresponds to an upward-facing thrust dynamic pressure bearing surface, and the rotor annular surface 232, which corresponds to a downward-facing thrust dynamic pressure bearing surface, are arranged to together define the upper thrust dynamic pressure bearing portion 694. The rotating portion 2a is axially supported by each of the lower and upper thrust dynamic pressure bearing portions 693 and 694. In addition, as in the first preferred embodiment, a radial dynamic pressure bearing portion 68 is defined in the radial gap 51, and the shaft 41 is thereby supported in the radial direction.

Figure 18:
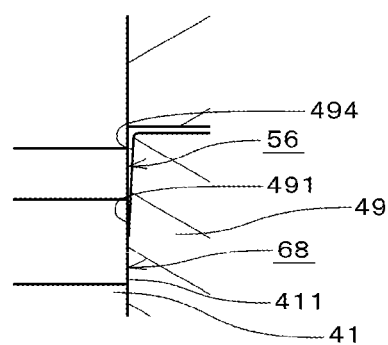
FIG. 18 is a cross-sectional view illustrating a portion of the bearing mechanism.

Referring to FIG. 18, an upper portion of the inner circumferential surface 491 of the sleeve 49 includes an inclined surface 494 arranged to extend radially inward and obliquely downward from the upper surface 493 of the sleeve 49. A portion of a radial dynamic pressure groove array arranged to define the radial dynamic pressure bearing portion 68 is defined in the inclined surface 494. When the shaft 41 is tilted while the fan 1a is driven, the inclined surface 494 extends along the outer circumferential surface 411 of the shaft 41 in a gap 56 defined between the inclined surface 494 and the outer circumferential surface 411 of the shaft 41. A fluid dynamic pressure is thereby generated in the gap 56, so that the shaft 41 is prevented from coming into contact with an upper portion of the sleeve 49.

In the second preferred embodiment, as well as in the first preferred embodiment, use of a fluid dynamic bearing mechanism as the bearing mechanism contributes to reducing vibrations of the fan 1a. Since the bearing mechanism 4a has the full-fill structure, a leakage of the lubricating oil 46 due to a difference in pressure between seal portions does not occur.

Because a lower end of the bearing portion 44a is arranged at a level higher than that of the lower end of the impeller 12, a center of gravity of the motor 11a is located inside the impeller 12, and the impeller 12 is capable of stable rotation. Because the motor 11a is a three-phase motor, the motor 11a is capable of causing the impeller 12 to rotate in a sufficient manner even when the motor 11a has a relatively small size. Also in the second preferred embodiment, the radial width of the radial gap 51 is arranged to be 5 μm or greater in order to achieve a sufficient reduction in the vibrations of the fan 1a, and is arranged to be 20 μm or less in order to generate a sufficient fluid dynamic pressure in the radial gap 51. More preferably, the width of the radial gap 51 is arranged in the range of about 5 m to about 10 μm. The same is true of other preferred embodiments of the present invention described below.

In addition, while the motor 11a is stationary, a magnetic center of the stator 32 is located at a level lower than that of a magnetic center of the rotor magnet 22. This contributes to reducing a force that acts to lift the impeller 12 relative to the stationary portion 3a during rotation of the fan 1a. This contributes to reducing an increase in a bearing loss that occurs in the lower thrust dynamic pressure bearing portion 693 in the case of the motor 11a illustrated in FIG. 17.

Figure 19:
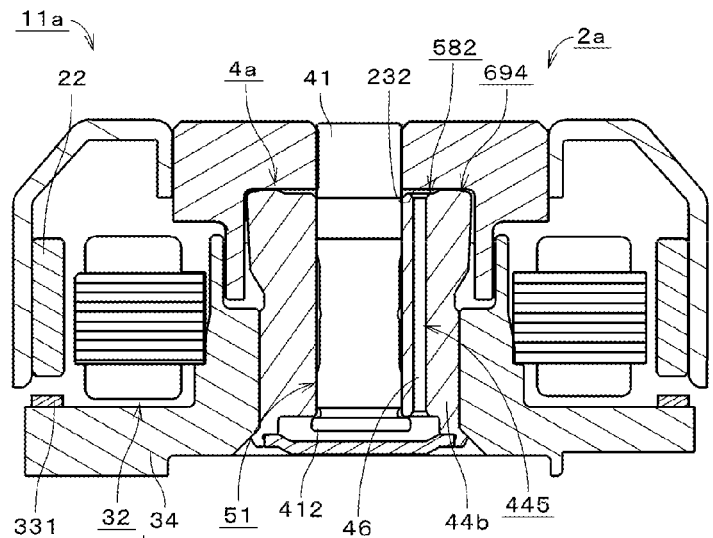
FIG. 19 is a cross-sectional view of a motor according to a modification of the second preferred embodiment.

FIG. 19 is a cross-sectional view of a motor 11a according to a modification of the second preferred embodiment. A bearing mechanism 4a of the motor 11a includes a bearing portion 44b defined by a single sleeve made of a metal. The bearing mechanism 4a does not include the first thrust portion 42. A lower end portion 412 of a shaft 41 is arranged to have a diameter slightly greater than that of a remaining portion of the shaft 41. The lower end portion 412 is arranged axially opposite a lower surface of the bearing portion 44b. An annular magnetic member 331 is arranged on an upper surface of a motor base portion 34 and at a position axially opposed to a rotor magnet 22. A magnetic action is generated between the magnetic member 331 and the rotor magnet 22 to attract the rotor magnet 22 downward. The bearing mechanism 4a according to the present modification of the second preferred embodiment is otherwise similar in structure to the bearing mechanism 4a illustrated in FIG. 16.

The bearing portion 44b includes a communicating hole 445 arranged to extend in the vertical direction through the bearing portion 44b. In the bearing mechanism 4a, an upper thrust dynamic pressure bearing portion 694 as a thrust dynamic pressure bearing portion is defined in an upper thrust gap 582 defined between a rotor annular surface 232 and an upper surface of the bearing portion 44b. The communicating hole 445 is arranged to connect the upper thrust gap 582 and a lower portion of a radial gap 51 with each other. While the motor 11a is driven, a lubricating oil 46 is arranged to circulate through the upper thrust gap 582, the radial gap 51, and the communicating hole 445. A rotating portion 2a of the motor 11a is stably supported in the thrust direction with respect to a stationary portion 3a thereof through the thrust dynamic pressure bearing portion 694 and the magnetic action generated between the magnetic member 331 and the rotor magnet 22.

Figure 20:
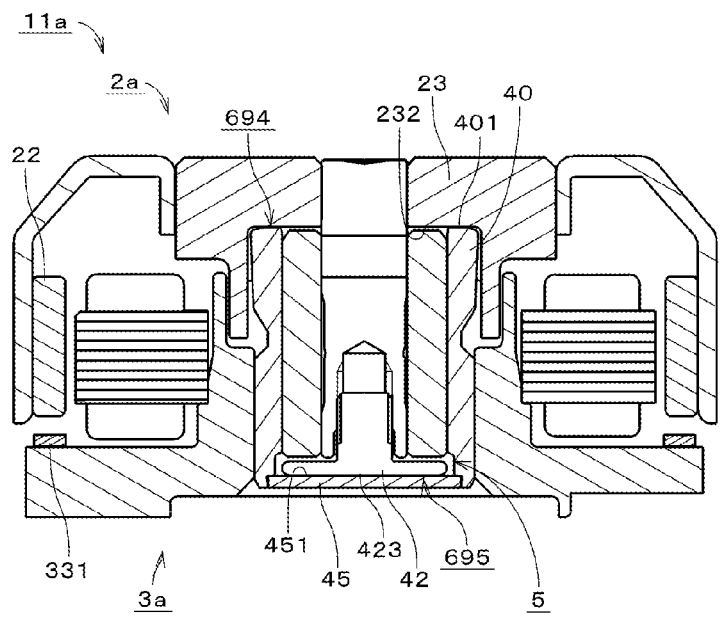
FIG. 20 is a cross-sectional view of a motor according to another modification of the second preferred embodiment.
Figure 2:
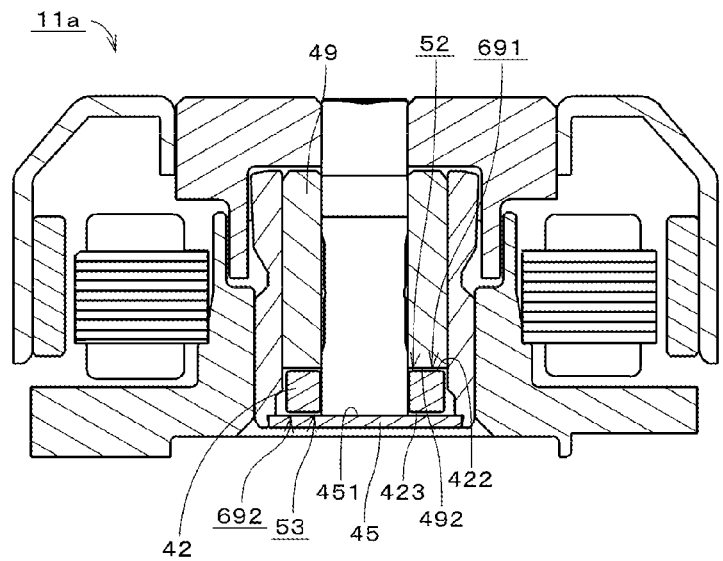
Figure 2:
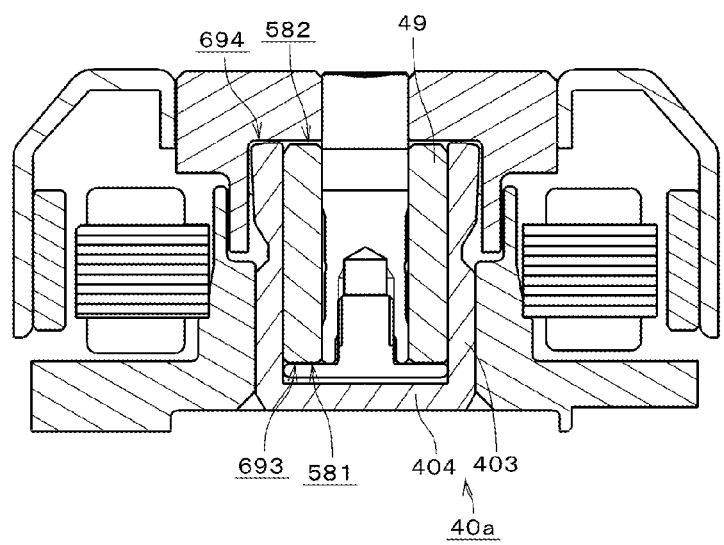

FIG. 20 is a cross-sectional view of a motor 11a according to another modification of the second preferred embodiment. In the motor 11a, a lower thrust dynamic pressure bearing portion 695 is defined between an upper surface 451 of a thrust cap 45 and a downward-facing "lower annular surface" 423 of a first thrust portion 42 as illustrated in FIG. 16. The lower annular surface 423 is a surface of the first thrust portion 42 which faces downward in the axial direction. An upper thrust dynamic pressure bearing portion 694 is defined between a rotor annular surface 232 of a second thrust portion 23 and an upper surface 401 of a bearing housing 40. The upper surface 401 faces upward in the axial direction. A rotating portion 2a of the motor 11a is stably supported in the axial direction with respect to a stationary portion 3a thereof through the lower and upper thrust dynamic pressure bearing portions 695 and 694 and a magnetic action generated between a magnetic member 331 and a rotor magnet 22.

FIG. 21 is a cross-sectional view of a motor 11a according to yet another modification of the second preferred embodiment. In the motor 11a, a first lower thrust dynamic pressure bearing portion 691 is defined in a first lower thrust gap 52 defined between an upper annular surface 422 of a first thrust portion 42 and a lower surface 492 of a sleeve 49, which is axially opposed to the upper annular surface 422. A second lower thrust dynamic pressure bearing portion 692 is defined in a second lower thrust gap 53 defined between a lower annular surface 423 of the thrust plate 42 and an upper surface 451 of a thrust cap 45. The thrust plate 42 is supported in the axial direction through the first and second lower thrust dynamic pressure bearing portions 691 and 692.

FIG. 22 is a cross-sectional view of a motor 11a according to yet another modification of the second preferred embodiment. In the motor 11a, a bearing housing 40a is defined by a single continuous member. The bearing housing 40a includes a substantially cylindrical side portion 403 arranged to cover an outer circumferential surface of a sleeve 49, and a bottom portion 404 arranged to close a bottom portion of the side portion 403. In FIG. 22, a lower thrust dynamic pressure bearing portion 693 and an upper thrust dynamic pressure bearing portion 694 are defined in a lower thrust gap 581 and an upper thrust gap 582, respectively, as is the case with the bearing mechanism 4a illustrated in FIG. 16.

Note that, as in FIG. 20, it may be so arranged that a lower thrust dynamic pressure bearing portion 695 is defined below a first thrust portion 42, while the upper thrust dynamic pressure bearing portion 694 is defined below a second thrust portion 23. Also note that, as in FIG. 21, a first lower thrust dynamic pressure bearing portion 691 and a second lower thrust dynamic pressure bearing portion 692 may be defined above and below, respectively, the first thrust portion 42.

Third Preferred Embodiment

Figure 23:
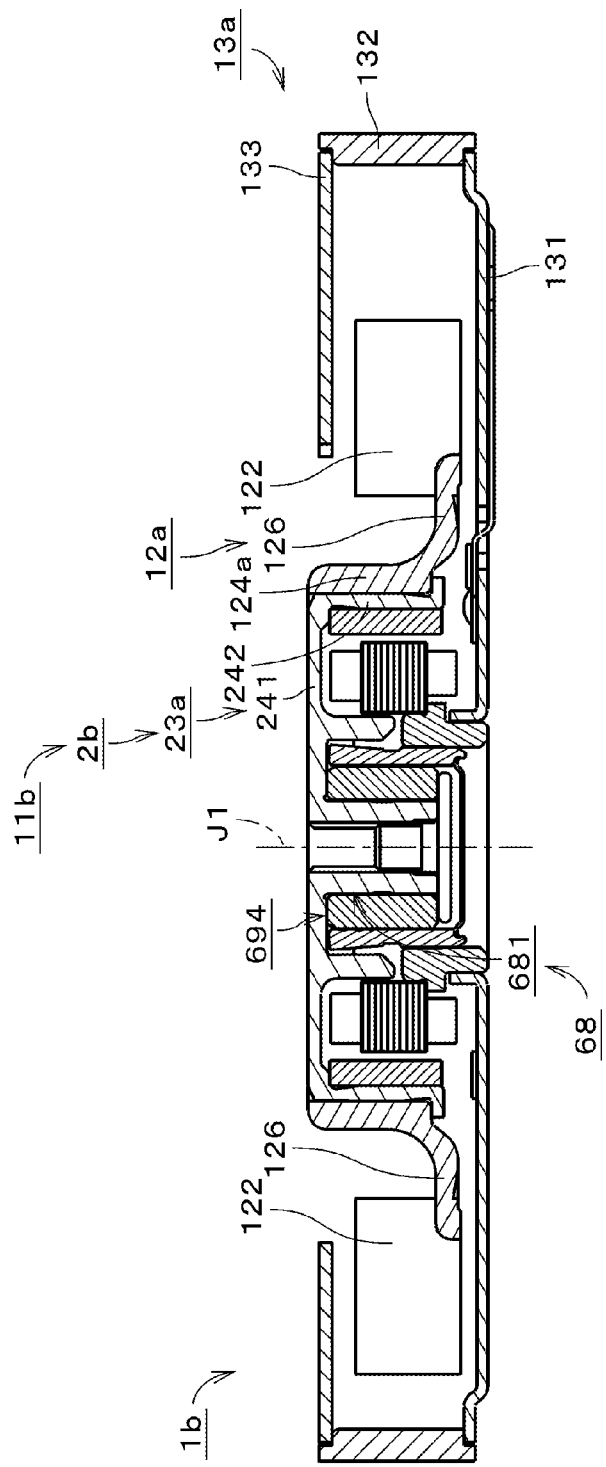
FIG. 23 is a cross-sectional view of a fan according to a third preferred embodiment of the present invention.

FIG. 23 is a cross-sectional view of a centrifugal fan 1b according to a third preferred embodiment of the present invention. Hereinafter, the centrifugal fan will be referred to simply as the fan. The fan 1b includes a motor 11b, an impeller 12a, and a housing 13a. In the following description, those members or portions of the fan 1b which have their equivalents in the first or second preferred embodiment are denoted by the same reference numerals as those of their equivalents in the first or second preferred embodiment. The housing 13a includes a base portion 131, a side wall portion 132, and a cover portion 133. The base portion 131 is arranged to support the motor 11b. The side wall portion 132 is arranged to surround an outer circumference of the impeller 12a. The cover portion 133 is arranged axially above a plurality of blades 122 of the impeller 12a.

Figure 24:
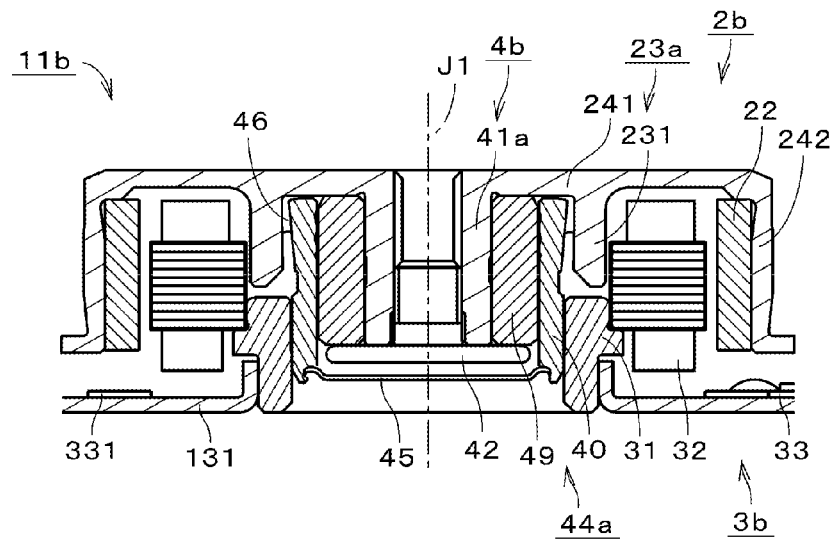
FIG. 24 is a cross-sectional view of a motor according to the third preferred embodiment.

FIG. 24 is a diagram illustrating the motor 11b. The motor 11b is a three-phase outer-rotor motor. The motor 11b includes a rotating portion 2b, a stationary portion 3b, and a bearing mechanism 4b. The rotating portion 2b includes a rotor magnet 22 and a rotor holder 23a. The rotating portion 2b is supported through the bearing mechanism 4b such that the rotating portion 2b is rotatable about a central axis J1 with respect to the stationary portion 3b.

The rotor holder 23a includes a top plate portion 241, a tubular portion 231, and a cylindrical portion 242. The top plate portion 241 is arranged substantially in the shape of a disk and centered on the central axis J1. Each of the tubular portion 231 and the cylindrical portion 242 is arranged substantially in the shape of a cylinder and centered on the central axis J1. Each of the tubular portion 231 and the cylindrical portion 242 is arranged to extend downward from a lower surface of the top plate portion 241. The top plate portion 241, the tubular portion 231, the cylindrical portion 242, and a shaft 41a of the bearing mechanism 4b, which will be described below, are defined by a single member. The tubular portion 231 is arranged radially outward of the shaft 41a. The cylindrical portion 242 is arranged radially outward of the tubular portion 231. The rotor magnet 22 is fixed to an inner circumferential surface of the cylindrical portion 242.

The stationary portion 3b includes a substantially cylindrical bearing support portion 31, a stator 32, and a circuit board 33. A lower portion of the bearing support portion 31 is fixed to an inner circumferential surface of the base portion 131 which defines a central hole portion of the base portion 131. The stator 32 is fixed to an outer circumferential surface of the bearing support portion 31 on an upper side of the base portion 131. The stator 32 is arranged radially inside the rotor magnet 22. The circuit board 33 is fixed onto the base portion 131. The stator 32 and the circuit board 33 are electrically connected with each other. While the motor 11b is driven, a turning force is generated between the rotor magnet 22 and the stator 32.

While the motor 11b is stationary, a magnetic center of the stator 32 is located at a level lower than that of a magnetic center of the rotor magnet 22. This contributes to reducing a force that acts to lift the impeller 12a relative to the stationary portion 3b during rotation of the fan 1b. The same is true of other preferred embodiments of the present invention described below.

An annular magnetic member 331 is arranged on the base portion 131. The magnetic member 331 is arranged under the rotor magnet 22. In the fan 1b, magnetic attraction forces that act to attract the rotor magnet 22 downward are generated between the rotor magnet 22 and the stator 32, and between the rotor magnet 22 and the magnetic member 331. This contributes to further reducing the force that acts to lift the impeller 12a relative to the stationary portion 3b during the rotation of the fan 1b. The same is true of other preferred embodiments of the present invention described below.

The bearing mechanism 4b includes the shaft 41a, a thrust plate 42, a bearing portion 44a, a thrust cap 45, which corresponds to a cap member, and a lubricating oil 46. The shaft 41a is arranged to extend downward from the lower surface of the top plate portion 241 of the rotor holder 23a. The shaft 41a is arranged substantially in the shape of a cylinder and centered on the central axis J1. The thrust plate 42 is fixed to a bottom portion of the shaft 41a. The thrust plate 42 is arranged to extend radially outward from a lower end of the shaft 41a. The thrust plate 42 corresponds to a thrust portion arranged axially opposite the bearing portion 44a.

The bearing portion 44a is arranged radially inward of the stator 32. The bearing portion 44a includes a tubular sleeve 49 and a bearing housing 40. The sleeve 49 is defined by a metallic sintered body. A lower portion of the bearing housing 40 is fixed inside the bearing support portion 31. The tubular portion 231 is arranged radially outward of the bearing housing 40. The bearing housing 40 is arranged to cover an outer circumferential surface of the sleeve 49. The sleeve 49 is arranged to cover an outer circumference of the shaft 41a. The thrust cap 45 is arranged to close a bottom portion of the bearing housing 40. In a lower portion of the bearing mechanism 4b, the sleeve 49 is axially opposed to the thrust plate 42. In an upper portion of the bearing mechanism 4b, each of the sleeve 49 and the bearing housing 40 is axially opposed to the top plate portion 241 of the rotor holder 23a.

Figure 25:
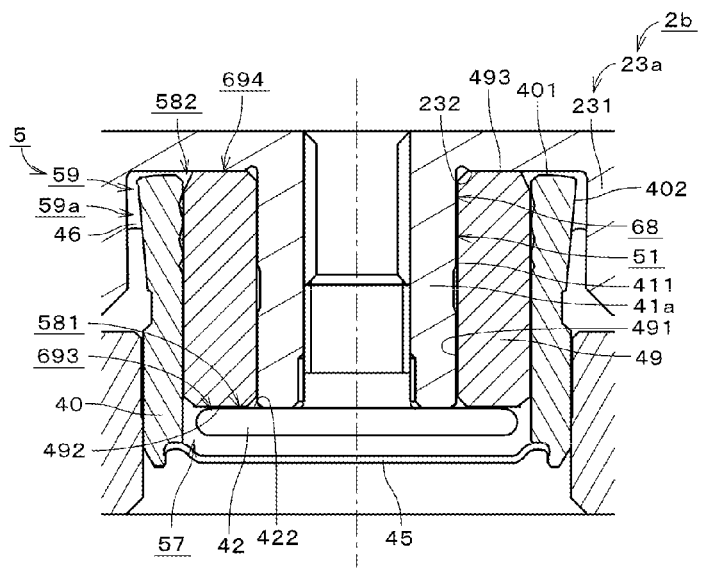
FIG. 25 is a cross-sectional view of a bearing mechanism according to the third preferred embodiment.

Referring to FIG. 25, a lower gap 57 is defined between an outer edge portion of the thrust plate 42 and a lower portion of an inner circumferential surface of the bearing housing 40, and between a lower surface of the thrust plate 42 and an upper surface of the thrust cap 45. A lower surface 492 of the sleeve 49, which faces downward in the axial direction, is arranged axially opposite an upper annular surface 422 of the thrust plate 42, and a lower thrust gap 581 is defined between the lower surface 492 and the upper annular surface 422. A radial gap 51 is defined between an inner circumferential surface 491 of the sleeve 49 and an outer circumferential surface 411 of the shaft 41a. A lower surface of the rotor holder 23a includes an annular "rotor annular surface" 232 facing downward in the axial direction and arranged around the shaft 41a and inside of the tubular portion 231. The rotor annular surface 232 is arranged axially opposite each of an upper surface 493 of the sleeve 49 and an upper surface 401 of the bearing housing 40, each of which faces upward in the axial direction. An upper thrust gap 582 is defined between the rotor annular surface 232 and each of the upper surface 493 of the sleeve 49 and the upper surface 401 of the bearing housing 40. A seal gap 59 is defined between an upper portion of an outer circumferential surface 402 of the bearing housing 40 and an inner circumferential surface of the tubular portion 231 of the rotor holder 23a. The seal gap 59 is arranged to gradually increase in width with decreasing height.

In the motor 11b, the seal gap 59, the upper thrust gap 582, the radial gap 51, the lower thrust gap 581, and the lower gap 57 are arranged to together define a single continuous bladder structure 5. The lubricating oil 46 is arranged continuously in the bladder structure 5. A seal portion 59a arranged to retain the lubricating oil 46 through capillary action is defined in the seal gap 59. A surface of the lubricating oil 46 is defined only in the seal gap 59.

The lower surface 492 of the sleeve 49 includes a thrust dynamic pressure groove array similar to the thrust dynamic pressure groove array 721 illustrated in FIG. 6 defined therein, and a lower thrust dynamic pressure bearing portion 693 arranged to generate a fluid dynamic pressure acting in the thrust direction is defined in the lower thrust gap 581. The upper surface 493 of the sleeve 49 includes a thrust dynamic pressure groove array similar to the thrust dynamic pressure groove array 722 illustrated in FIG. 7 defined therein, and an upper thrust dynamic pressure bearing portion 694 arranged to generate a fluid dynamic pressure in the lubricating oil 46 is defined in the upper thrust gap 582. The rotating portion 2b is axially supported by each of the lower and upper thrust dynamic pressure bearing portions 693 and 694. In addition, as in the first preferred embodiment, a radial dynamic pressure bearing portion 68 is defined in the radial gap 51, and the shaft 41a is thereby supported in the radial direction. Note that an upper portion of the inner circumferential surface 491 of the sleeve 49 may include an inclined surface similar to the inclined surface 494 illustrated in FIG. 18.

In the third preferred embodiment, as well as in the first preferred embodiment, use of a fluid dynamic bearing mechanism as the bearing mechanism contributes to reducing vibrations of the fan 1b. Since the bearing mechanism 4b has the full-fill structure, a leakage of the lubricating oil 46 due to a difference in pressure between seal portions does not occur. The same is true of other preferred embodiments of the present invention described below.

The impeller 12a illustrated in FIG. 23 is made of a resin, and includes a substantially cylindrical fixing portion 124a, the plurality of blades 122, and a plurality of blade support portions 126. The fixing portion 124a is fixed to an outer circumferential surface of the cylindrical portion 242 of the rotor holder 23a. The fixing portion 124a defines a portion of the rotating portion 2b of the motor 11b. If each of the top plate portion 241 and the cylindrical portion 242 of the rotor holder 23a is regarded as a portion of the impeller 12a, the top plate portion 241 defines a top face portion of a cup arranged substantially in the shape of a covered cylinder. The top face portion is arranged to extend perpendicularly to the central axis J1. In addition, a structure made up of the cylindrical portion 242 and the fixing portion 124a defines a side wall portion of the cup. The side wall portion is arranged to extend downward from an outer edge portion of the top plate portion 241.

The blade support portions 126 are arranged to extend radially outward from an outer circumferential surface of the fixing portion 124a with the central axis J1 as a center. Each of the blades 122 is supported on an end of a separate one of the blade support portions 126. The blades 122 are arranged to extend radially outward from the ends of the blade support portions 126 with the central axis J1 as a center. The fixing portion 124a, the plurality of blade support portions 126, and the plurality of blades 122 are defined integrally with one another by a resin injection molding process.

The fan 1b is arranged to produce air currents traveling from an upper opening toward a side of the fan 1b through rotation of the impeller 12a about the central axis J1 caused by the motor 11b.

An upper end of each blade 122 is arranged at a level lower than that of the lower surface of the top plate portion 241 of the rotor holder 23a. The lower surface of the top plate portion 241 corresponds to a downward-facing thrust dynamic pressure bearing surface of the upper thrust dynamic pressure bearing portion 694. A center of gravity of the impeller 12a is thereby located on an axially lower side. This enables the impeller 12a to rotate stably. As a result, a reduction in the vibrations of the fan 1b is achieved. Furthermore, a lower end of the cover portion 133 of the housing 13a is also arranged at a level lower than that of the lower surface of the top plate portion 241 of the rotor holder 23a. The blades 122 are thereby located further downward in the axial direction, and the center of gravity of the impeller 12a is also thereby located further downward in the axial direction. As a result, an additional reduction in the vibrations of the fan 1b is achieved.

The upper end of each of the blades 122 is arranged at a level lower than that of a center of pressure of an upper radial dynamic pressure bearing portion 681. The center of pressure of the upper radial dynamic pressure bearing portion 681 refers to an axial center of a pressure distribution of the upper radial dynamic pressure bearing portion 681 while the rotating portion 2b is rotated. As a result of the above arrangement, the center of gravity of the impeller 12a is located on the axially lower side. As a result, a reduction in the vibrations of the fan 1b is achieved. Instead of the above arrangement, the upper end of each of the blades 122 may be arranged at a level lower than that of a center of the upper radial dynamic pressure bearing portion 681. The center of the upper radial dynamic pressure bearing portion 681 refers to an axial center of a region extending from an axially upper end to an axially lower end of a first radial dynamic pressure groove array 711 (see FIG. 5). This arrangement also causes the center of gravity of the impeller 12a to be located on the axially lower side. As a result, a reduction in the vibrations of the fan 1b is achieved.

In the fan 1b, an upper surface of the top plate portion 241 of the rotor holder 23a may include a hole portion defined therein, and a weight similar to the weight 129 illustrated in FIG. 1 may be arranged in this hole portion. A weight may also be arranged on a lower end of the cylindrical portion 242 of the rotor holder 23a or on a lower end of the fixing portion 124a of the impeller 12a. Arrangement of these weights can reduce unbalance of each of the impeller 12a and the rotating portion 2b of the motor 11b. The reduction in the unbalance leads to a reduction in vibrations of the fan 1b owing to a displacement of the center of gravity of any of the impeller 12a and the motor 11b from the central axis J1. Moreover, when the radial dynamic pressure bearing portion 68 is arranged axially between the two weights, each of the rotating portion 2b and the impeller 12a is capable of stable rotation, and a further reduction in the vibrations is achieved. The same is true of other preferred embodiments of the present invention described below.

Figure 26:
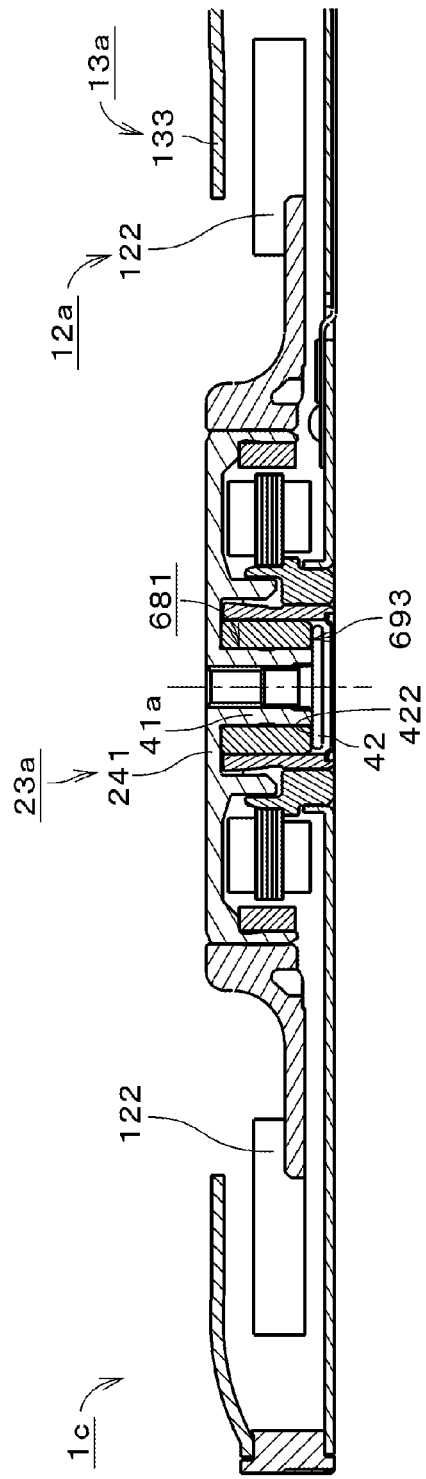
FIG. 26 is a cross-sectional view of a motor according to a modification of the third preferred embodiment.

FIG. 26 is a diagram illustrating a fan 1c according to a modification of the third preferred embodiment. The fan 1c is different from the fan 1b illustrated in FIG. 23 in the shape of a housing 13a and the shape of an impeller 12a. Referring to FIG. 26, an upper end of each of a plurality of blades 122 is arranged at a level lower than that of a lower surface of a top plate portion 241 of a rotor holder 23a. A center of gravity of the impeller 12a is thereby located on an axially lower side. As a result, similarly to the fan 1b, the fan 1c is able to achieve reduced vibration. A lower end of a cover portion 133 of the housing 13a is also arranged at a level lower than that of the lower surface of the top plate portion 241 of the rotor holder 23a. The center of gravity of the impeller 12a is thereby located further downward in the axial direction. As a result, an additional reduction in vibrations of the fan 1c is achieved.

The upper end of each of the blades 122 is arranged at a level lower than that of a center of pressure of an upper radial dynamic pressure bearing portion 681. The center of gravity of the impeller 12a is thereby located on the axially lower side. As a result, a reduction in the vibrations of the fan 1c is achieved. Instead of the above arrangement, the upper end of each of the blades 122 may be arranged at a level lower than that of a center of the upper radial dynamic pressure bearing portion 681. This arrangement also causes the center of gravity of the impeller 12a to be located on the axially lower side. As a result, a reduction in the vibrations of the fan 1c is achieved.

A lower end of each of the blades 122 is arranged at a level higher than that of an upper annular surface 422 of a thrust plate 42. The upper annular surface 422 corresponds to an upward-facing thrust dynamic pressure bearing surface of a lower thrust dynamic pressure bearing portion 693. The center of gravity of the impeller 12a is thereby located between an upper end and a lower end of a shaft 41a. As a result, the impeller 12a is capable of stable rotation, and a reduction in the vibrations of the fan 1c is achieved.

Figure 27:
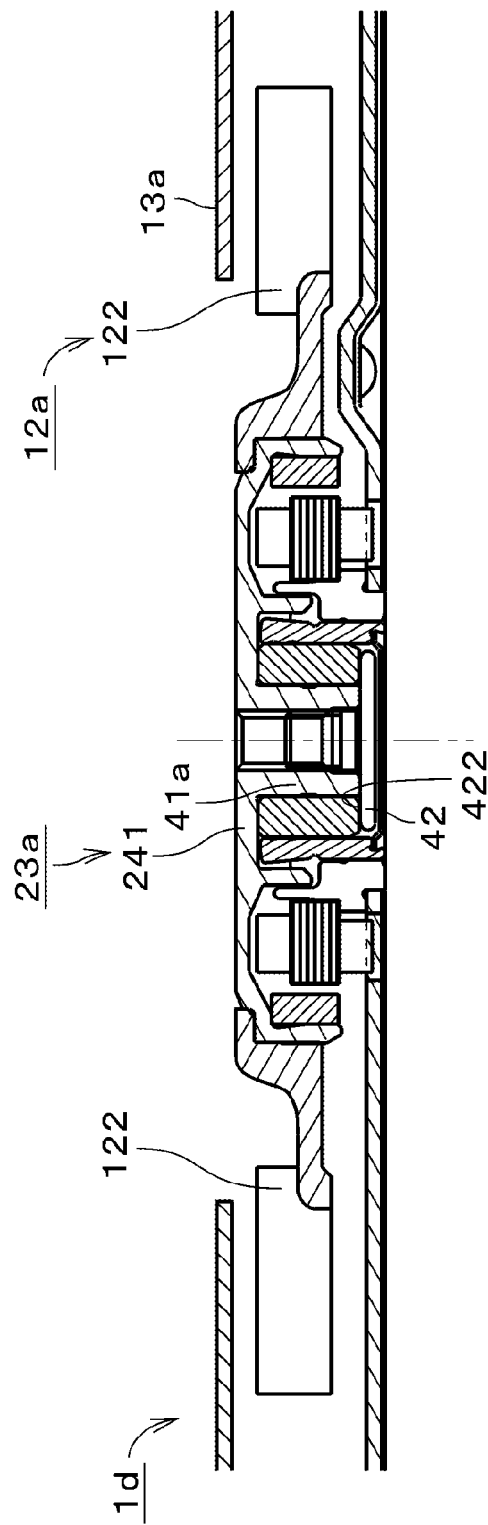
FIG. 27 is a cross-sectional view of a motor according to another modification of the third preferred embodiment.

FIG. 27 is a diagram illustrating a fan 1d according to another modification of the third preferred embodiment. The fan 1*d* is different from the fan 1*b* illustrated in FIG. 23 in the shape of a housing 13*a* and the shape of an impeller 12*a*. Referring to FIG. 27, a lower end of each of a plurality of blades 122 is arranged at a level higher than that of an upper annular surface 422 of a thrust plate 42. A center of gravity of the impeller 12*a* is thereby located between an upper end and a lower end of a shaft 41*a*. As a result, a reduction in vibrations of the fan 1*d* is achieved.

While preferred embodiments of the present invention have been described above, it will be understood that the present invention is not limited to the above-described preferred embodiments, and that a variety of modifications are possible.

In the second preferred embodiment, the thrust dynamic pressure groove array may be defined in the upper surface 493 of the sleeve 49 so that the thrust dynamic pressure bearing portion may be defined between the upper surface 493 of the sleeve 49 and the lower surface of the second thrust portion 23. In the third preferred embodiment, the thrust dynamic pressure groove array may be defined in the upper surface 401 of the bearing housing 40 so that the thrust dynamic pressure bearing portion may be defined between the upper surface 401 of the bearing housing 40 and the lower surface of the rotor holder 23*a*.

In the first preferred embodiment, an upper portion of the first radial dynamic pressure groove array 711 may be defined in the second inclined surface 441*b*. Also, no dynamic pressure grooves may be defined in the second inclined surface 441*b* of the bearing portion 44. Even in this case, provision of the second inclined surface 441*b* secures an area to support the shaft 41 so that bearing rigidity can be improved to a certain extent. The same is true of the sleeve 49 of each of the fans 1*a* and 1*b* according to the second and third preferred embodiments, respectively.

In each of the above-described preferred embodiments, each of the first and second radial dynamic pressure groove arrays 711 and 712 may be defined in the outer circumferential surface 411 of the shaft 41. Also, the thrust dynamic pressure groove arrays 721 and 722 may be defined in the upper surface and the lower surface, respectively, of the first thrust portion (i.e., the thrust plate) 42. Also, the communicating hole 421*a* may not necessarily be provided in the bearing mechanism 4.

In the first preferred embodiment, the outer circumferential surface 411 of the shaft 41 may be arranged to include a portion which has a decreased diameter in the vicinity of a top portion of the bearing portion 44 so that the seal portion may be defined between this portion and the inner circumferential surface 441 of the bearing portion 44. Also, the upper portion of the shaft 41 may be directly fixed to the impeller 12. Also, the shaft 41 may be fixed to the impeller 12 through two or more members. Also, a viscoseal that generates a fluid dynamic pressure through a dynamic pressure groove defined in the seal gap may be used as the seal portion. The same is true of each of the second and third preferred embodiments.

In the first preferred embodiment, a metallic member may be arranged, as the weight, in the balance correction portion 125 of the top face portion 123 of the impeller 12. Also, the balance correction portion 125 may be defined by a through hole or a cut. The same is true of the balance correction portion 124*a* of the side wall portion 124. Also, the weight may be arranged on only one of the top face portion 123 and the lower end portion 124*a* of the side wall portion 124. Also, the unbalance of the rotating portion 2 may be eliminated by removing a portion of the top face portion 123 or a portion of the side wall portion 124. The same is true of each of the second and third preferred embodiments.

The magnetic center of the stator 32 and the magnetic center of the rotor magnet 22 may be arranged to coincide with each other in the axial direction when the motor 11, 11*a*, 11*b*, 11*c*, or 11*d* is stationary. A reduction in the vibrations of the motor 11, 11*a*, 11*b*, 11*c*, or 11*d* can thereby be achieved.

Each of the motors 11 and 11*a* may be used as a motor of a fan of another type, such as a centrifugal fan. Each of the motors 11*b* to 11*d* may be used as a motor of a fan of another type, such as an axial fan. A fan in which any of the motors 11 and 11*a* to 11*d* is used is optimal for use with a device having a hard disk installed therein, such as a server. In the server, the fan is disposed at a position close to the hard disk. Therefore, if the fan is of a type which generates significant vibrations, read or write errors tend to easily occur in the hard disk. In contrast, read or write errors do not easily occur in the hard disk if the fan installed in the server uses any of the motors 11 and 11*a* to 11*d*.

Features of the above-described preferred embodiments and the modifications thereof may be combined appropriately as long as no conflict arises.

Figure 28:
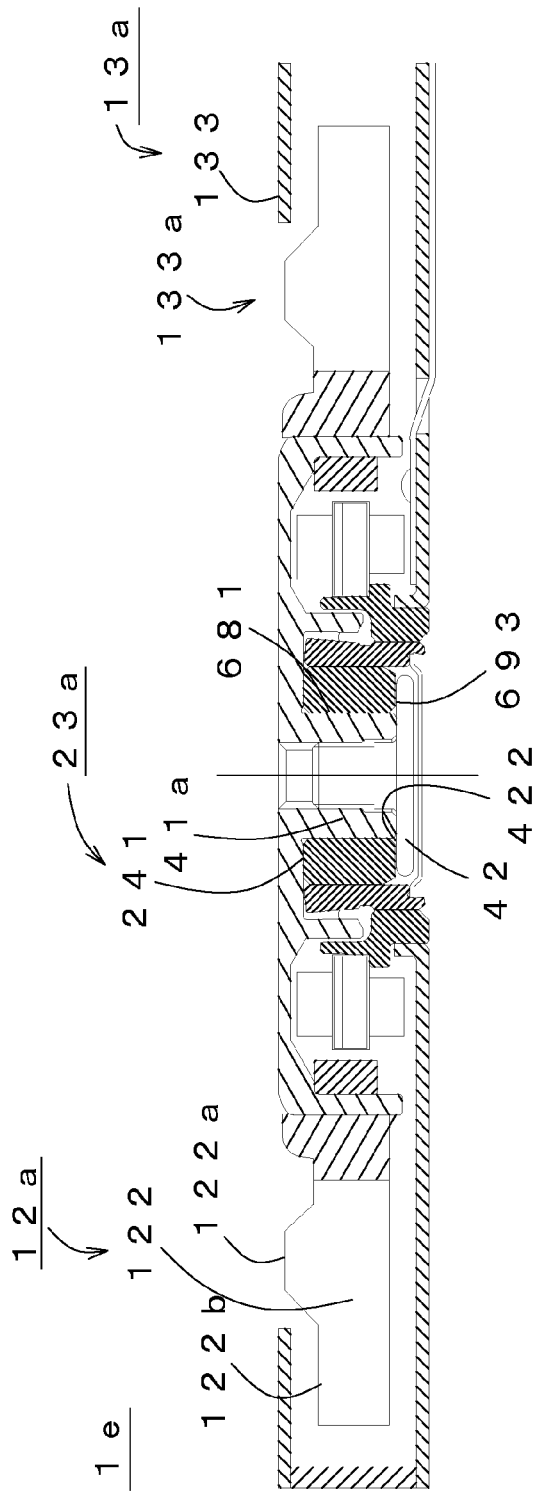
FIG. 28 is a cross-sectional view of a motor according to another modification of the fourth preferred embodiment.

FIG. 28 illustrates a fan 1*e* of another embodiment. The fan 1*e* has an impeller 12*a* whose shape is different from the fan 1*b* in FIG. 23. As illustrated in FIG. 28, each of the blades 122 has an upper edge. The upper edge includes a portion 122*a* in which it is axially opposed to the opening 133*a* of the cover portion 133, and another portion 122*b* in which it is axially opposed to the cover portion 133. Hereinafter, the portion 122*a* of the upper edge of the blades, axially opposed to the opening 133*a* of the cover portion 133, is called as a blade inner upper edge 122*a*. The portion 122*b* of the upper edge of the blades, axially opposed to the cover portion 133, is called as a blade outer upper edge 122*b*. The blade inner upper edge 122*a* is located axially above the blade outer upper edge 122*b*. In other words, the upper edges 122*a* of the blades 122, opposed to the opening 133*a* of the cover portion 133, are located axially above the upper edges 122*b* of the blades 122 opposed to the cover portion 133. Also, the blade inner upper edge 122*a* is radially opposed to the cover portion 133. In other words, the cover portion 133 is radially opposed to the upper edge 122*a* of the blades opposed to the opening 133*a* of the cover portion 133. Note that the blade inner upper edge 122*a* can be located axially lower than the cover portion 133.

The blade outer upper edge 122*b* is located lower than the lower surface of the top plate portion 241 of the rotor holder 23*a*. Namely, the portion 122*b* is located below another annular surface 241; the portion 122*b* being arranged at upper edges of the blades 122 and opposed to the cover portion 133. Thereby, the gravity center of the impeller 12*a* is axially at a lower side thereof. As results, the vibration caused by the fan 1*e* can be reduced in the same manner as the fan 1*b*.

The blade outer upper edge 122*b* is located lower than the pressure center of the upper radial dynamic pressure bearing portion 681. Thereby, the gravity center of the impeller 12*a* can be axially at a lower side thereof. As results, the vibration caused by the fan 1*e* can be reduced.

The lower edges of the blades 122 are located above the upper annular surface 422 of the thrust plate 42. The upper annular surface 422 serves as a thrust dynamic pressure bearing facing the upper direction, for the lower thrust dynamic pressure bearing portion 693. Thereby, the gravity center of the impeller 12*a* is located between the upper and lower ends of the shaft 41*a*. As results, the impeller 12*a* can be stably rotated, and the vibration of the fan 1*e* can be reduced.

The blade inner upper edge 122*a* is axially located above the blade outer upper edge 122*b*. Also, in the axial direction, the upper edges of the blades, where they are opposed to the opening 133*a* of the cover portion 133, are located above said another annular surface 241. Therefore, the following effects can be obtained. Namely, since the blade outer upper edge 122b is located axially lower than the blade inner upper edge 122a, the gravity center of the impeller 12a is located at a lower side thereof. Also, this configuration can facilitate the air flow from the opening 133a of the cover portion 133, while avoiding the generation of the reverse air flow toward the opening 133a. In view of the above, the vibration of the fan 1e can be reduced, and high air volume as well as high static pressure can be attained.

The present invention is applicable to fans arranged to produce air currents. Several embodiments of the present application can be as follows.

The 1st aspect: A fan comprising:
   a motor; and
   an impeller including a plurality of blades, and arranged to rotate about a central axis through the motor to produce air currents; wherein
   the motor includes:
      a stationary portion; and
      a rotating portion rotatably supported by the stationary portion;
   the stationary portion includes:
      a stator; and
      a bearing portion arranged inside of the stator;
   the rotating portion includes:
      a rotor magnet arranged radially outside the stator;
      a shaft inserted in the bearing portion, and having an upper portion fixed to the impeller directly or through one or more members; and
      a thrust portion arranged axially opposite the bearing portion, and including an annular surface arranged around the shaft;
   a radial dynamic pressure bearing portion arranged to generate a fluid dynamic pressure in a lubricating oil is defined in a radial gap defined between an inner circumferential surface of the bearing portion and an outer circumferential surface of the shaft, while a thrust dynamic pressure bearing portion arranged to generate a fluid dynamic pressure in the lubricating oil is defined in a thrust gap defined between the annular surface and a surface of the bearing portion which is axially opposed to the annular surface;
   a single seal gap arranged in an annular shape and centered on the central axis is defined between the stationary and rotating portions; and
   the seal gap, the radial gap, and the thrust gap are arranged to together define a single continuous bladder structure, the lubricating oil is arranged continuously in the bladder structure, and a surface of the lubricating oil is defined only in the seal gap.

The 2nd aspect: The fan according to the 1st aspect, wherein the bearing portion includes:
   a tubular sleeve; and
   a bearing housing arranged to cover an outer circumferential surface of the sleeve.

The 3rd aspect: The fan according to the 2nd aspect, wherein the stationary portion further includes a cap member arranged to close a lower end of the bearing housing.

The 4th aspect: The fan according to the 2nd aspect, wherein
   the bearing housing is defined by a single continuous member; and
   the bearing housing includes:
      a substantially cylindrical side portion arranged to cover the outer circumferential surface of the sleeve; and
      a bottom portion arranged to close a bottom portion of the side portion.

The 5th aspect: The fan according to the 1st aspect claim 1, wherein
   the thrust portion is a thrust plate arranged to extend radially outward from the shaft at a bottom portion of the bladder structure;
   an upper surface of the thrust plate includes an upward-facing thrust dynamic pressure bearing surface defined by the annular surface;
   the bearing portion includes a downward-facing thrust dynamic pressure bearing surface arranged to face downward in an axial direction;
   the upward-facing and downward-facing thrust dynamic pressure bearing surfaces are arranged axially opposite each other; and
   the thrust dynamic pressure bearing portion is defined by the upward-facing and downward-facing thrust dynamic pressure bearing surfaces.

The 6th aspect: The fan according to the 2nd aspect claim 2, wherein
   the thrust portion is a thrust plate arranged to extend radially outward from the shaft at a bottom portion of the bladder structure;
   an upper surface of the thrust plate includes an upward-facing thrust dynamic pressure bearing surface defined by the annular surface;
   the bearing portion includes a downward-facing thrust dynamic pressure bearing surface arranged to face downward in an axial direction;
   the upward-facing and downward-facing thrust dynamic pressure bearing surfaces are arranged axially opposite each other; and
   the thrust dynamic pressure bearing portion is defined by the upward-facing and downward-facing thrust dynamic pressure bearing surfaces.

The 7th aspect: The fan according to the 3rd aspect, wherein
   the thrust portion is a thrust plate arranged to extend radially outward from the shaft at a bottom portion of the bladder structure;
   an upper surface of the thrust plate includes an upward-facing thrust dynamic pressure bearing surface defined by the annular surface;
   the bearing portion includes a downward-facing thrust dynamic pressure bearing surface arranged to face downward in an axial direction;
   the upward-facing and downward-facing thrust dynamic pressure bearing surfaces are arranged axially opposite each other; and
   the thrust dynamic pressure bearing portion is defined by the upward-facing and downward-facing thrust dynamic pressure bearing surfaces.

The 8th aspect: The fan according to the 4th aspect, wherein
   the thrust portion is a thrust plate arranged to extend radially outward from the shaft at a bottom portion of the bladder structure;
   an upper surface of the thrust plate includes an upward-facing thrust dynamic pressure bearing surface defined by the annular surface;
   the bearing portion includes a downward-facing thrust dynamic pressure bearing surface arranged to face downward in an axial direction;
   the upward-facing and downward-facing thrust dynamic pressure bearing surfaces are arranged axially opposite each other; and the thrust dynamic pressure bearing portion is defined by the upward-facing and downward-facing thrust dynamic pressure bearing surfaces.

The 9th aspect: The fan according to the 5th aspect, wherein a lower end of each of the blades is arranged at a level higher than that of the upward-facing thrust dynamic pressure bearing surface.

The 10th aspect: The fan according to the 6th aspect, wherein a lower end of each of the blades is arranged at a level higher than that of the upward-facing thrust dynamic pressure bearing surface.

The 11th aspect: The fan according to the 7th aspect, wherein a lower end of each of the blades is arranged at a level higher than that of the upward-facing thrust dynamic pressure bearing surface.

The 12th aspect: The fan according to the 8th aspect, wherein a lower end of each of the blades is arranged at a level higher than that of the upward-facing thrust dynamic pressure bearing surface.

The 13th aspect: The fan according to the 5th aspect, wherein
a lower surface of the thrust plate includes another annular surface; and
the other annular surface is opposed to a bottom surface of the bladder structure to define another thrust dynamic pressure bearing portion.

The 14th aspect: The fan according to the 6th aspect, wherein
a lower surface of the thrust plate includes another annular surface; and
the other annular surface is opposed to a bottom surface of the bladder structure to define another thrust dynamic pressure bearing portion.

The 15th aspect: The fan according to the 7th aspect, wherein
a lower surface of the thrust plate includes another annular surface; and
the other annular surface is opposed to a bottom surface of the bladder structure to define another thrust dynamic pressure bearing portion.

The 16th aspect: The fan according to the 8th aspect, wherein
a lower surface of the thrust plate includes another annular surface; and
the other annular surface is opposed to a bottom surface of the bladder structure to define another thrust dynamic pressure bearing portion.

The 17th aspect: The fan according to the 9th aspect, wherein
a lower surface of the thrust plate includes another annular surface; and
the other annular surface is opposed to a bottom surface of the bladder structure to define another thrust dynamic pressure bearing portion.

The 18th aspect: The fan according to the 10th aspect, wherein
a lower surface of the thrust plate includes another annular surface; and
the other annular surface is opposed to a bottom surface of the bladder structure to define another thrust dynamic pressure bearing portion.

The 19th aspect: The fan according to the 11th aspect, wherein
a lower surface of the thrust plate includes another annular surface; and
the other annular surface is opposed to a bottom surface of the bladder structure to define another thrust dynamic pressure bearing portion.

The 20th aspect: The fan according to the 12th aspect, wherein
a lower surface of the thrust plate includes another annular surface; and
the other annular surface is opposed to a bottom surface of the bladder structure to define another thrust dynamic pressure bearing portion.

The 21th aspect: The fan according to the 5th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 22th aspect: The fan according to the 6th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 23th aspect: The fan according to the 7th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 24th aspect: The fan according to the 8th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 25th aspect: The fan according to the 9th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 26th aspect: The fan according to the 10th aspect, wherein
  the rotating portion includes a tubular portion arranged to extend downward and centered on the central axis, and arranged radially opposite an outer circumferential surface of the bearing portion; and
  the seal gap is defined between an upper portion of the outer circumferential surface of the bearing portion and an inner circumferential surface of the tubular portion, the seal gap being arranged to gradually increase in radial width with decreasing height.

The 27th aspect: The fan according to the 11th aspect, wherein
  the rotating portion includes a tubular portion arranged to extend downward and centered on the central axis, and arranged radially opposite an outer circumferential surface of the bearing portion; and
  the seal gap is defined between an upper portion of the outer circumferential surface of the bearing portion and an inner circumferential surface of the tubular portion, the seal gap being arranged to gradually increase in radial width with decreasing height.

The 28th aspect: The fan according to the 12th aspect, wherein
  the rotating portion includes a tubular portion arranged to extend downward and centered on the central axis, and arranged radially opposite an outer circumferential surface of the bearing portion; and
  the seal gap is defined between an upper portion of the outer circumferential surface of the bearing portion and an inner circumferential surface of the tubular portion, the seal gap being arranged to gradually increase in radial width with decreasing height.

The 29th aspect: The fan according to the 5th aspect, wherein
  the rotating portion further includes another thrust portion arranged to extend radially outward from the upper portion of the shaft;
  the bearing portion includes a surface arranged to face upward in the axial direction;
  the other thrust portion includes another annular surface arranged axially opposite the surface arranged to face upward in the axial direction; and
  the surface arranged to face upward in the axial direction and the other annular surface are arranged to together define another thrust dynamic pressure bearing portion.

The 30th aspect: The fan according to the 6th aspect, wherein
  the rotating portion further includes another thrust portion arranged to extend radially outward from the upper portion of the shaft;
  the bearing portion includes a surface arranged to face upward in the axial direction;
  the other thrust portion includes another annular surface arranged axially opposite the surface arranged to face upward in the axial direction; and
  the surface arranged to face upward in the axial direction and the other annular surface are arranged to together define another thrust dynamic pressure bearing portion.

The 31th aspect: The fan according to the 7th aspect, wherein
  the rotating portion further includes another thrust portion arranged to extend radially outward from the upper portion of the shaft;
  the bearing portion includes a surface arranged to face upward in the axial direction;
  the other thrust portion includes another annular surface arranged axially opposite the surface arranged to face upward in the axial direction; and
  the surface arranged to face upward in the axial direction and the other annular surface are arranged to together define another thrust dynamic pressure bearing portion.

The 32th aspect: The fan according to the 8th aspect, wherein
  the rotating portion further includes another thrust portion arranged to extend radially outward from the upper portion of the shaft;
  the bearing portion includes a surface arranged to face upward in the axial direction;
  the other thrust portion includes another annular surface arranged axially opposite the surface arranged to face upward in the axial direction; and
  the surface arranged to face upward in the axial direction and the other annular surface are arranged to together define another thrust dynamic pressure bearing portion.

The 33th aspect: The fan according to the 9th aspect, wherein
  the rotating portion further includes another thrust portion arranged to extend radially outward from the upper portion of the shaft;
  the bearing portion includes a surface arranged to face upward in the axial direction;
  the other thrust portion includes another annular surface arranged axially opposite the surface arranged to face upward in the axial direction; and
  the surface arranged to face upward in the axial direction and the other annular surface are arranged to together define another thrust dynamic pressure bearing portion.

The 34th aspect: The fan according to the 10th aspect, wherein
  the rotating portion further includes another thrust portion arranged to extend radially outward from the upper portion of the shaft;
  the bearing portion includes a surface arranged to face upward in the axial direction;
  the other thrust portion includes another annular surface arranged axially opposite the surface arranged to face upward in the axial direction; and
  the surface arranged to face upward in the axial direction and the other annular surface are arranged to together define another thrust dynamic pressure bearing portion.

The 35th aspect: The fan according to the 11th aspect, wherein
  the rotating portion further includes another thrust portion arranged to extend radially outward from the upper portion of the shaft;
  the bearing portion includes a surface arranged to face upward in the axial direction;
  the other thrust portion includes another annular surface arranged axially opposite the surface arranged to face upward in the axial direction; and
  the surface arranged to face upward in the axial direction and the other annular surface are arranged to together define another thrust dynamic pressure bearing portion.

The 36th aspect: The fan according to the 12th aspect, wherein
  the rotating portion further includes another thrust portion arranged to extend radially outward from the upper portion of the shaft;
  the bearing portion includes a surface arranged to face upward in the axial direction;

the other thrust portion includes another annular surface arranged axially opposite the surface arranged to face upward in the axial direction; and the surface arranged to face upward in the axial direction and the other annular surface are arranged to together define another thrust dynamic pressure bearing portion.

The 37th aspect: The fan according to the 29th aspect, wherein an upper end of each of the blades is arranged at a level lower than that of the other annular surface.

The 38th aspect: The fan according to the 30th aspect, wherein an upper end of each of the blades is arranged at a level lower than that of the other annular surface.

The 39th aspect: The fan according to the 31th aspect, wherein an upper end of each of the blades is arranged at a level lower than that of the other annular surface.

The 40th aspect: The fan according to the 32th aspect, wherein an upper end of each of the blades is arranged at a level lower than that of the other annular surface.

The 41th aspect: The fan according to the 33th aspect, wherein an upper end of each of the blades is arranged at a level lower than that of the other annular surface.

The 42th aspect: The fan according to the 34th aspect, wherein an upper end of each of the blades is arranged at a level lower than that of the other annular surface.

The 43th aspect: The fan according to the 35th aspect, wherein an upper end of each of the blades is arranged at a level lower than that of the other annular surface.

The 44th aspect: The fan according to the 36th aspect, wherein an upper end of each of the blades is arranged at a level lower than that of the other annular surface.

The 45th aspect: The fan according to the 37th aspect, further comprising a cover portion arranged axially above the blades, wherein a lower end of the cover portion is arranged at a level lower than that of the other annular surface.

The 46th aspect: The fan according to the 38th aspect, further comprising a cover portion arranged axially above the blades, wherein a lower end of the cover portion is arranged at a level lower than that of the other annular surface.

The 47th aspect: The fan according to the 39th aspect, further comprising a cover portion arranged axially above the blades, wherein a lower end of the cover portion is arranged at a level lower than that of the other annular surface.

The 48th aspect: The fan according to the 40th aspect, further comprising a cover portion arranged axially above the blades, wherein a lower end of the cover portion is arranged at a level lower than that of the other annular surface.

The 49th aspect: The fan according to the 41th aspect, further comprising a cover portion arranged axially above the blades, wherein a lower end of the cover portion is arranged at a level lower than that of the other annular surface.

The 50th aspect: The fan according to the 42th aspect, further comprising a cover portion arranged axially above the blades, wherein a lower end of the cover portion is arranged at a level lower than that of the other annular surface.

The 51th aspect: The fan according to the 43th aspect, further comprising a cover portion arranged axially above the blades, wherein a lower end of the cover portion is arranged at a level lower than that of the other annular surface.

The 52th aspect: The fan according to the 44th aspect, further comprising a cover portion arranged axially above the blades, wherein a lower end of the cover portion is arranged at a level lower than that of the other annular surface.

The 53th aspect: The fan according to the 29th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 54th aspect: The fan according to the 30th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 55th aspect: The fan according to the 31th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 56th aspect: The fan according to the 32th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 57th aspect: The fan according to the 33th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 58th aspect: The fan according to the 34th aspect, wherein
the rotating portion includes a tubular portion arranged to extend downward and centered on the central axis, and arranged radially opposite an outer circumferential surface of the bearing portion; and
the seal gap is defined between an upper portion of the outer circumferential surface of the bearing portion and an inner circumferential surface of the tubular portion, the seal gap being arranged to gradually increase in radial width with decreasing height.

The 59th aspect: The fan according to the 35th aspect, wherein
the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 60th aspect: The fan according to the 36th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 61h aspect: The fan according to the 37th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 62th aspect: The fan according to the 38th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 63th aspect: The fan according to the 39th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 64th aspect: The fan according to the 40th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 65th aspect: The fan according to the 41th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 66th aspect: The fan according to the 42th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 67th aspect: The fan according to the 43th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 68th aspect: The fan according to the 44th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 69th aspect: The fan according to the 45th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 70th aspect: 70. The fan according to the 46th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 71th aspect: The fan according to the 47th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 72th aspect: The fan according to the 48th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 73th aspect: The fan according to the 49th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 74th aspect: The fan according to the 50th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 75th aspect: The fan according to the 51th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 76th aspect: The fan according to the 52th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 77th aspect: The fan according to the 1st aspect, wherein the thrust portion is arranged to extend radially outward from the upper portion of the shaft;

the bearing portion includes an upward-facing thrust dynamic pressure bearing surface arranged to face upward in an axial direction;

the annular surface is a downward-facing thrust dynamic pressure bearing surface arranged axially opposite the upward-facing thrust dynamic pressure bearing surface; and the thrust dynamic pressure bearing portion is defined by the upward-facing and downward-facing thrust dynamic pressure bearing surfaces.

The 78th aspect: The fan according to the 2nd aspect, wherein the thrust portion is arranged to extend radially outward from the upper portion of the shaft;

the bearing portion includes an upward-facing thrust dynamic pressure bearing surface arranged to face upward in an axial direction;

the annular surface is a downward-facing thrust dynamic pressure bearing surface arranged axially opposite the upward-facing thrust dynamic pressure bearing surface; and the thrust dynamic pressure bearing portion is defined by the upward-facing and downward-facing thrust dynamic pressure bearing surfaces.

The 79th aspect: The fan according to the 3rd aspect, wherein the thrust portion is arranged to extend radially outward from the upper portion of the shaft;

the bearing portion includes an upward-facing thrust dynamic pressure bearing surface arranged to face upward in an axial direction;

the annular surface is a downward-facing thrust dynamic pressure bearing surface arranged axially opposite the upward-facing thrust dynamic pressure bearing surface; and the thrust dynamic pressure bearing portion is defined by the upward-facing and downward-facing thrust dynamic pressure bearing surfaces.

The 80th aspect: The fan according to the 4th aspect, wherein the thrust portion is arranged to extend radially outward from the upper portion of the shaft;

the bearing portion includes an upward-facing thrust dynamic pressure bearing surface arranged to face upward in an axial direction;

the annular surface is a downward-facing thrust dynamic pressure bearing surface arranged axially opposite the upward-facing thrust dynamic pressure bearing surface; and the thrust dynamic pressure bearing portion is defined by the upward-facing and downward-facing thrust dynamic pressure bearing surfaces.

The 81th aspect: The fan according to the 77th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 82th aspect: The fan according to the 78th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 83th aspect: The fan according to the 79th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 84th aspect: The fan according to the 80th aspect, wherein the rotating portion includes a tubular portion arranged to extend downward and centered on the central axis, and arranged radially opposite an outer circumferential surface of the bearing portion; and the seal gap is defined between an upper portion of the outer circumferential surface of the bearing portion and an inner circumferential surface of the tubular portion, the seal gap being arranged to gradually increase in radial width with decreasing height.

The 85th aspect: The fan according to any one of claims 1, wherein the radial dynamic pressure bearing portion includes:
an upper radial dynamic pressure bearing portion; and
a lower radial dynamic pressure bearing portion arranged below and spaced from the upper radial dynamic pressure bearing portion; and
an upper end of each of the blades is arranged at a level lower than that of a center of pressure of the upper radial dynamic pressure bearing portion when the rotating portion is rotated.

The 86th aspect: The fan according to any one of claims 1, wherein the radial dynamic pressure bearing portion includes:
an upper radial dynamic pressure bearing portion; and
a lower radial dynamic pressure bearing portion arranged below and spaced from the upper radial dynamic pressure bearing portion; and
an upper end of each of the blades is arranged at a level lower than that of a center of the upper radial dynamic pressure bearing portion.

What is claimed is:

1. A fan comprising:
a motor; and
an impeller including a plurality of blades, and arranged to rotate about a central axis through the motor to produce air currents; wherein
the motor includes:
a stationary portion; and
a rotating portion rotatably supported by the stationary portion;
the stationary portion includes:
a stator; and
a bearing portion arranged inside of the stator;
the rotating portion includes:
a rotor magnet arranged radially outside the stator;
a shaft inserted in the bearing portion, and having an upper portion fixed to the impeller directly or through one or more members; and
a first thrust portion arranged axially opposite the bearing portion, and including a first annular surface arranged around the shaft;
a radial dynamic pressure bearing portion arranged to generate a fluid dynamic pressure in a lubricating oil is defined in a radial gap defined between an inner circumferential surface of the bearing portion and an outer circumferential surface of the shaft, while a first thrust dynamic pressure bearing portion arranged to generate a fluid dynamic pressure in the lubricating oil is defined in a thrust gap defined between the first annular surface and a surface of the bearing portion which is axially opposed to the first annular surface;
a single seal gap arranged in an annular shape and centered on the central axis is defined between the stationary and rotating portions; and
the seal gap, the radial gap, and the thrust gap are arranged to together define a single continuous bladder structure, the lubricating oil is arranged continuously in the bladder structure, and a surface of the lubricating oil is defined only in the seal gap,
the first thrust portion is a thrust plate arranged to extend radially outward from the shaft at a bottom portion of the bladder structure;
an upper surface of the thrust plate includes an upward-facing thrust dynamic pressure bearing surface defined by the first annular surface;
the bearing portion includes a downward-facing thrust dynamic pressure bearing surface arranged to face downward in an axial direction;
the upward-facing and downward-facing thrust dynamic pressure bearing surfaces are arranged axially opposite each other; and
the first thrust dynamic pressure bearing portion is defined by the upward-facing and downward-facing thrust dynamic pressure bearing surfaces,
the rotating portion further includes a second thrust portion arranged to extend radially outward from the upper portion of the shaft;
the bearing portion includes a surface arranged to face upward in the axial direction;
the second thrust portion includes a second annular surface arranged axially opposite the surface arranged to face upward in the axial direction; and
the surface arranged to face upward in the axial direction and the second annular surface are arranged to together define a second thrust dynamic pressure bearing portion,
the fan further comprises a cover portion having an opening, arranged axially above said plurality of blades,
in the axial direction, a first upper edge of said plurality of blades, opposed to the cover portion, is located lower than the second annular surface.

2. The fan according to claim 1, wherein the bearing portion includes:
a tubular sleeve; and
a bearing housing arranged to cover an outer circumferential surface of the sleeve.

3. The fan according to claim 2, wherein the stationary portion further includes a cap member arranged to close a lower end of the bearing housing.

4. The fan according to claim 2, wherein
the bearing housing is defined by a single continuous member; and
the bearing housing includes:
- a substantially cylindrical side portion arranged to cover the outer circumferential surface of the sleeve; and
- a bottom portion arranged to close a bottom portion of the side portion.

5. The fan according to claim 1, wherein a second upper edge of said plurality of blades opposed to the opening of the cover portion is located above the first upper edge of said plurality of blade opposed to the cover portion.

6. The fan according to claim 5, wherein the cover portion is radially opposed to the second upper edge of said plurality of blades opposed to the opening of the cover portion.

7. The fan according to claim 5, wherein in the axial direction, the second upper edge of said plurality of blades opposed to the opening of the cover portion is located above said another annular surface.

* * * * *